United States Patent
Galer

(10) Patent No.: US 7,073,293 B2
(45) Date of Patent: Jul. 11, 2006

(54) HORIZONTAL SLIDER WINDOW ASSEMBLY

(75) Inventor: Jim Galer, Hudsonville, MI (US)

(73) Assignee: Donnelly Corporation, Holland, MI (US)

(*) Notice: Subject to any disclaimer, the term of this patent is extended or adjusted under 35 U.S.C. 154(b) by 280 days.

(21) Appl. No.: 10/697,372

(22) Filed: Oct. 29, 2003

(65) Prior Publication Data

US 2004/0134131 A1    Jul. 15, 2004

Related U.S. Application Data

(60) Provisional application No. 60/422,421, filed on Oct. 30, 2002.

(51) Int. Cl.
*E05D 15/06* (2006.01)

(52) U.S. Cl. ......................................... 49/413; 49/360

(58) Field of Classification Search ................ 49/413, 49/380, 121, 118, 360, 61; 24/701
See application file for complete search history.

(56) References Cited

U.S. PATENT DOCUMENTS

| | | | |
|---|---|---|---|
| 1,204,702 A * | 11/1916 | Schupp | 454/29 |
| 3,237,250 A | 3/1966 | Scoville | |
| 3,893,260 A | 7/1975 | Cadiou | |
| 4,081,926 A | 4/1978 | Jardin | |
| 4,124,054 A | 11/1978 | Spretnjak | |
| 4,158,270 A | 6/1979 | Cherbourg et al. | |
| 4,171,594 A | 10/1979 | Colanzi | |
| 4,635,398 A | 1/1987 | Nakamura | |
| 4,674,231 A | 6/1987 | Radek et al. | |
| 4,738,052 A | 4/1988 | Yoshida | |
| 4,785,583 A | 11/1988 | Kawagoe et al. | |
| 4,920,698 A | 5/1990 | Friese et al. | |
| 4,934,098 A | 6/1990 | Prouteau et al. | |
| 4,970,911 A | 11/1990 | Ujihara et al. | |
| 4,995,195 A | 2/1991 | Olberding et al. | |
| 5,046,283 A | 9/1991 | Compeau et al. | |
| 5,146,712 A | 9/1992 | Hlavaty | |
| 5,228,740 A | 7/1993 | Saltzman | |
| 5,245,788 A | 9/1993 | Riegelman | |
| 5,294,168 A | 3/1994 | Kronbetter | |
| 5,333,411 A | 8/1994 | Tschirschwitz et al. | |
| 5,345,717 A | 9/1994 | Mori et al. | |
| 5,442,880 A | 8/1995 | Gipson | |
| 5,467,560 A | 11/1995 | Camp et al. | |
| 5,473,840 A | 12/1995 | Gillen et al. | |
| 5,505,023 A | 4/1996 | Gillen et al. | |
| 5,522,191 A | 6/1996 | Wenner et al. | |
| 5,531,046 A | 7/1996 | Kollar et al. | |
| 5,542,214 A | 8/1996 | Buening | |
| 5,613,323 A | 3/1997 | Buening | |
| 5,711,112 A | 1/1998 | Barten et al. | |
| 5,724,769 A | 3/1998 | Cripe et al. | |
| 5,784,833 A | 7/1998 | Sponable et al. | |
| 5,799,444 A | 9/1998 | Freimark et al. | |
| 5,799,449 A | 9/1998 | Lyons et al. | |

(Continued)

*Primary Examiner*—Gregory J. Strimbu
(74) *Attorney, Agent, or Firm*—Van Dyke, Gardner, Linn & Burkhart, LLP

(57) ABSTRACT

A vehicular rear window assembly for a vehicle comprises a first fixed pane, a second fixed pane, a sliding pane, which is supported for horizontal movement between open and closed positions, and a drive assembly. The slider window assembly includes a support system that supports the fixed panes in a manner to define a central opening. The support system further includes a carrier that supports the sliding pane for horizontal movement and, further, provides an enhanced engagement between the sliding pane and the drive assembly.

29 Claims, 16 Drawing Sheets

U.S. PATENT DOCUMENTS

| | | |
|---|---|---|
| 5,822,922 A | 10/1998 | Grumm et al. |
| 5,953,887 A | 9/1999 | Lucas et al. |
| 5,996,284 A | 12/1999 | Freimark et al. |
| 6,014,840 A | 1/2000 | Ray et al. |
| 6,026,611 A | 2/2000 | Ralston et al. |
| 6,112,462 A | 9/2000 | Kolar |
| 6,119,401 A | 9/2000 | Lin et al. |
| 6,119,402 A | 9/2000 | Wisner |
| 6,125,585 A | 10/2000 | Koneval et al. |
| 6,324,788 B1 * | 12/2001 | Koneval et al. ............... 49/121 |
| 6,591,552 B1 | 7/2003 | Rasmussen |
| 6,742,819 B1 * | 6/2004 | So et al. ...................... 292/225 |
| 6,766,617 B1 * | 7/2004 | Purcell ........................ 49/360 |
| 2003/0140562 A1 * | 7/2003 | Staser et al. ................... 49/352 |

* cited by examiner

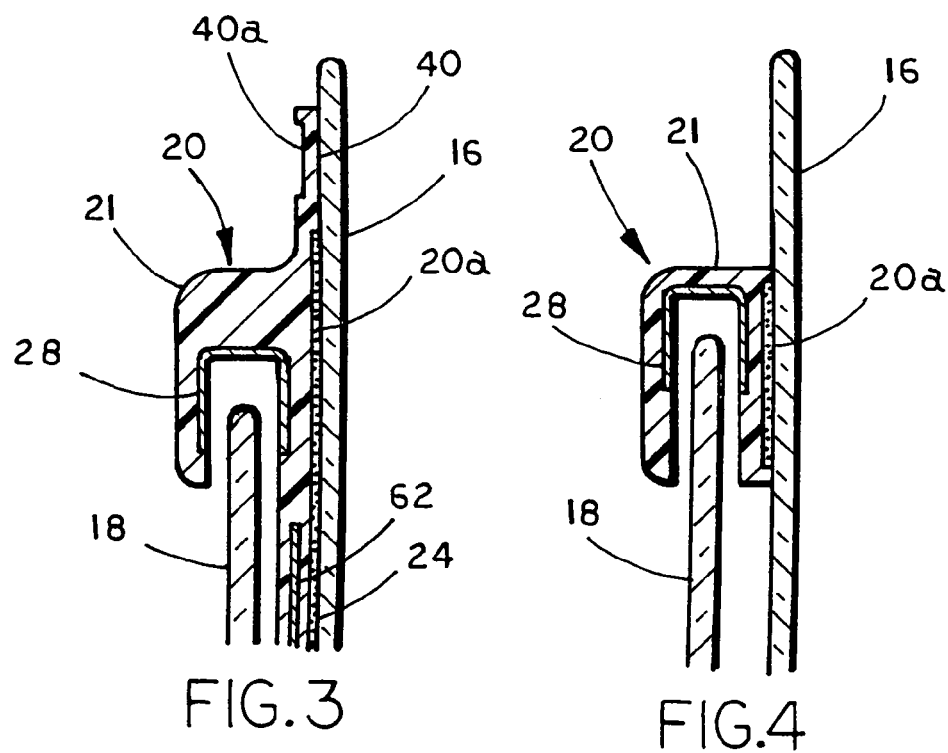
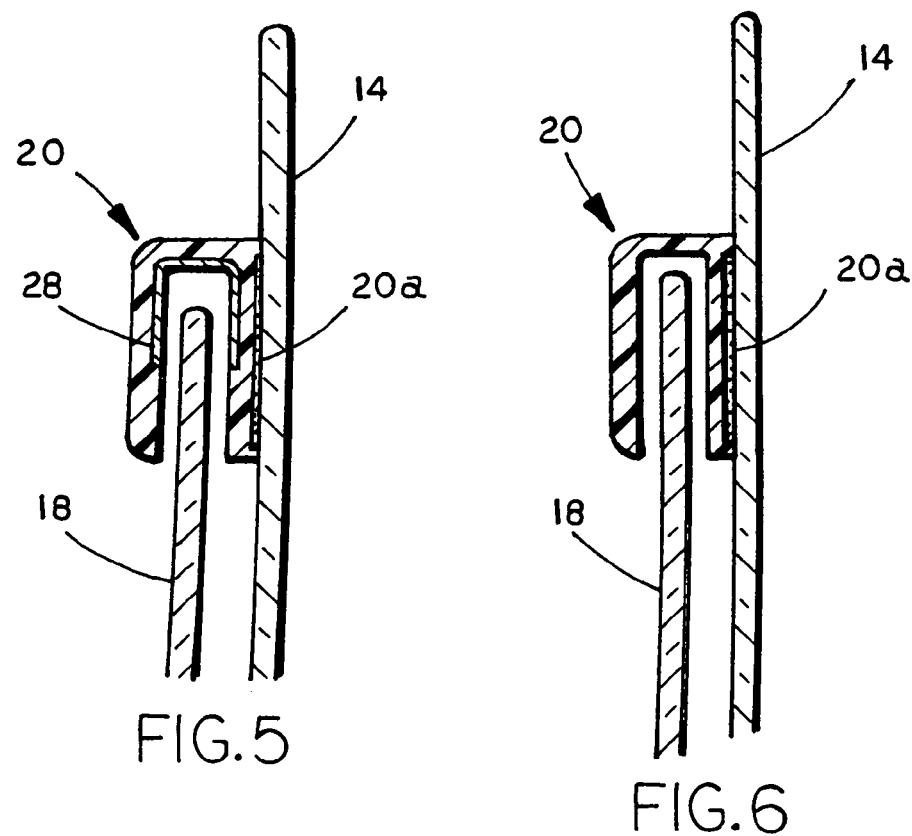

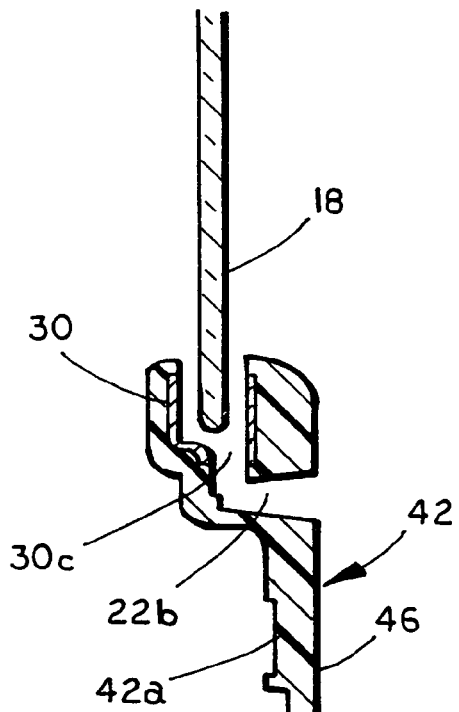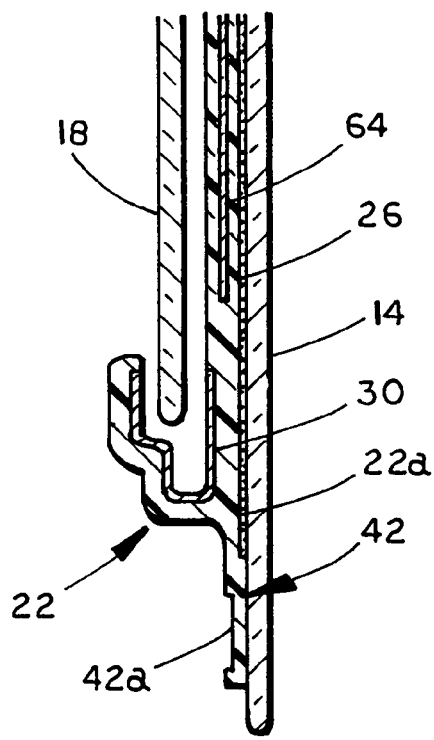
FIG.7   FIG.8
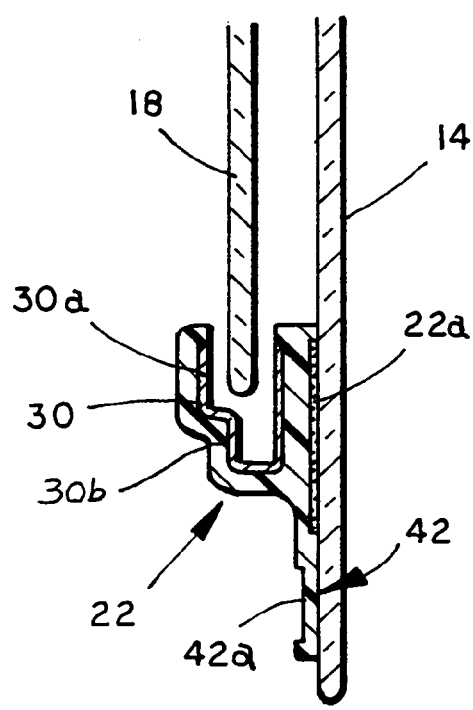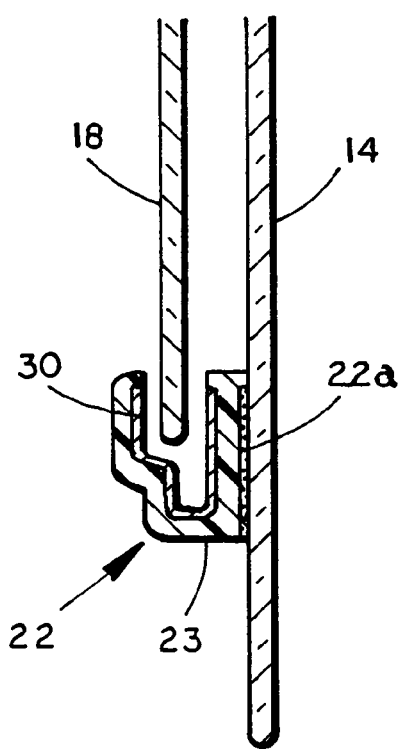
FIG.9   FIG.10

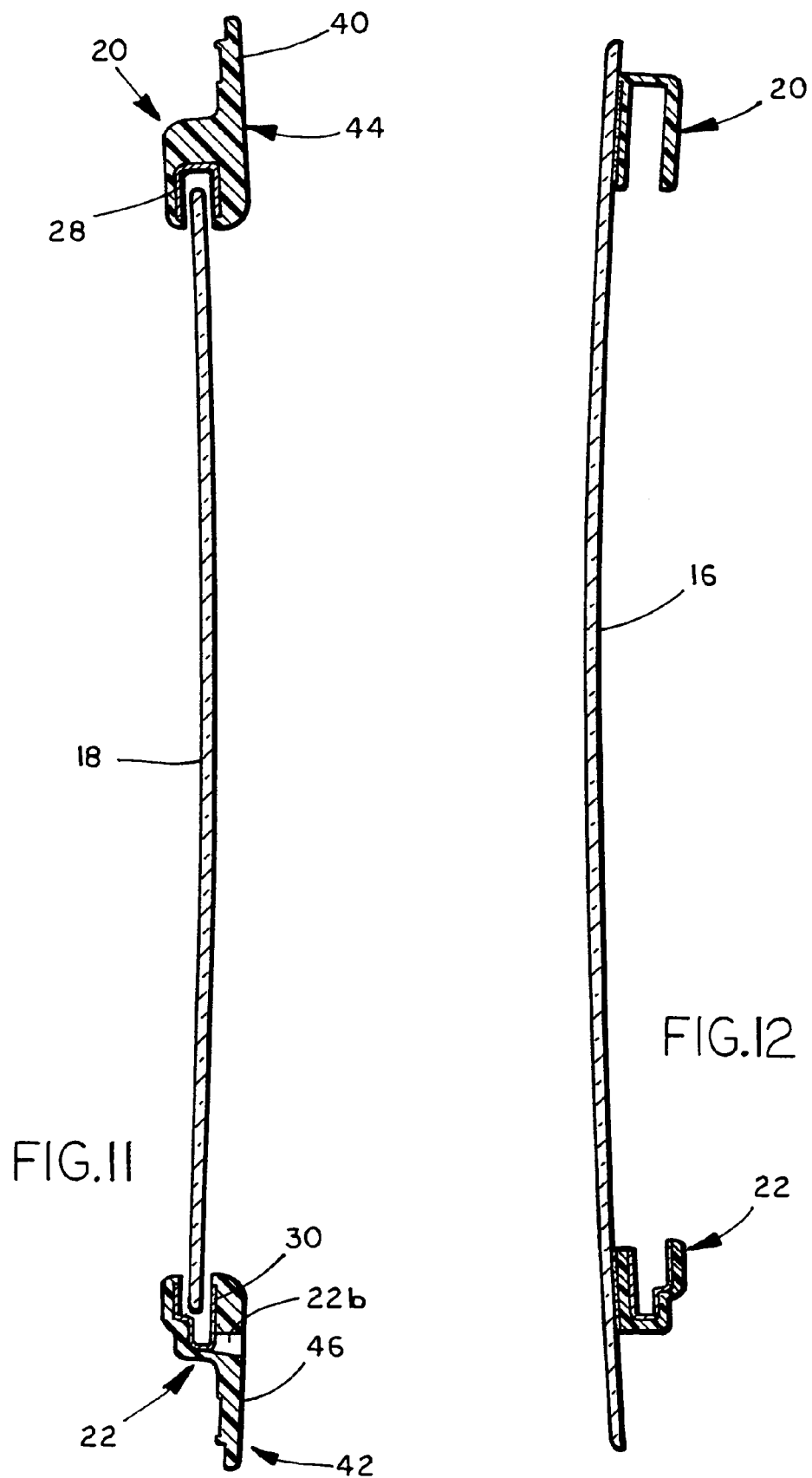

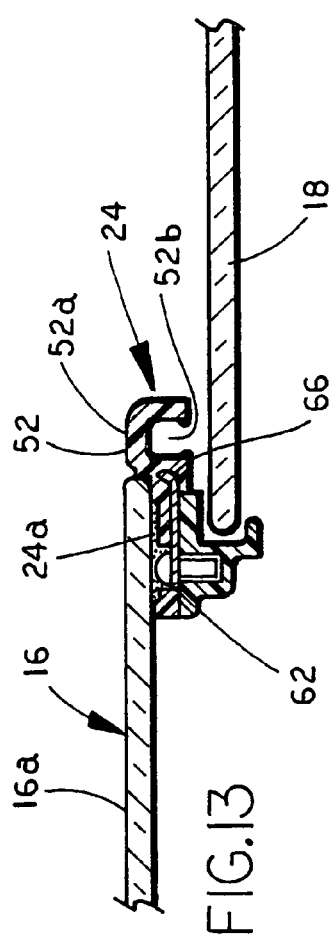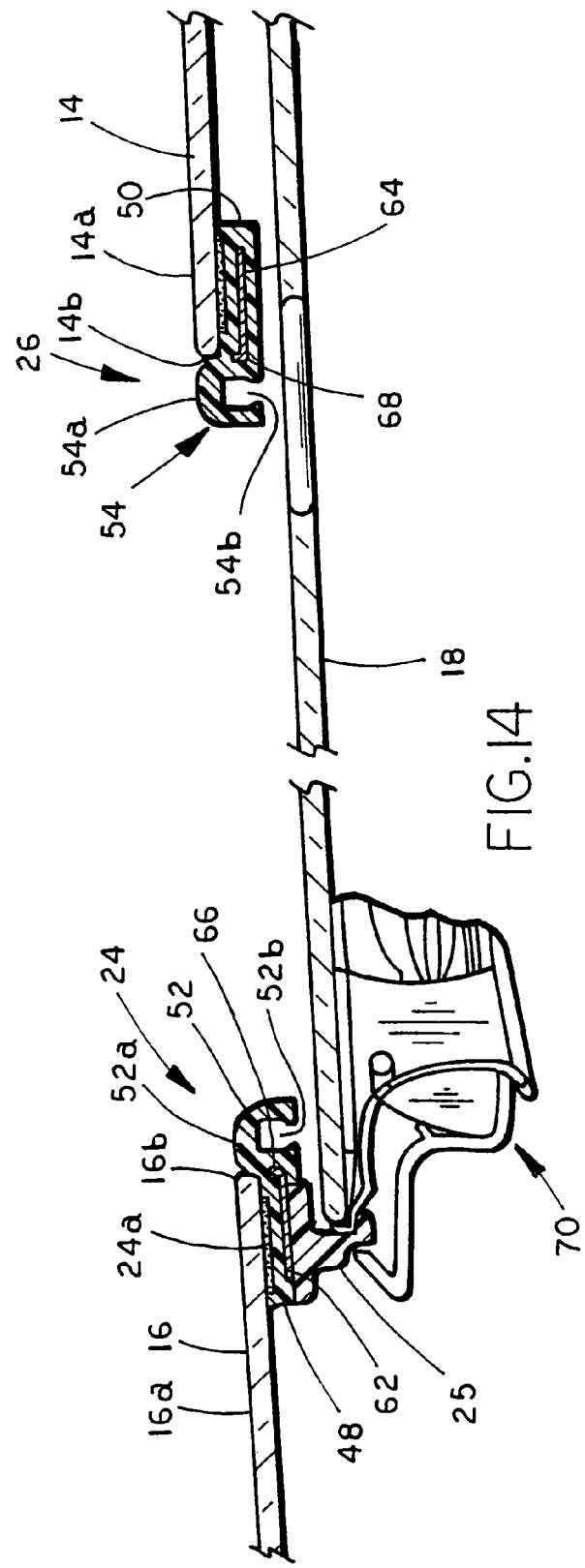

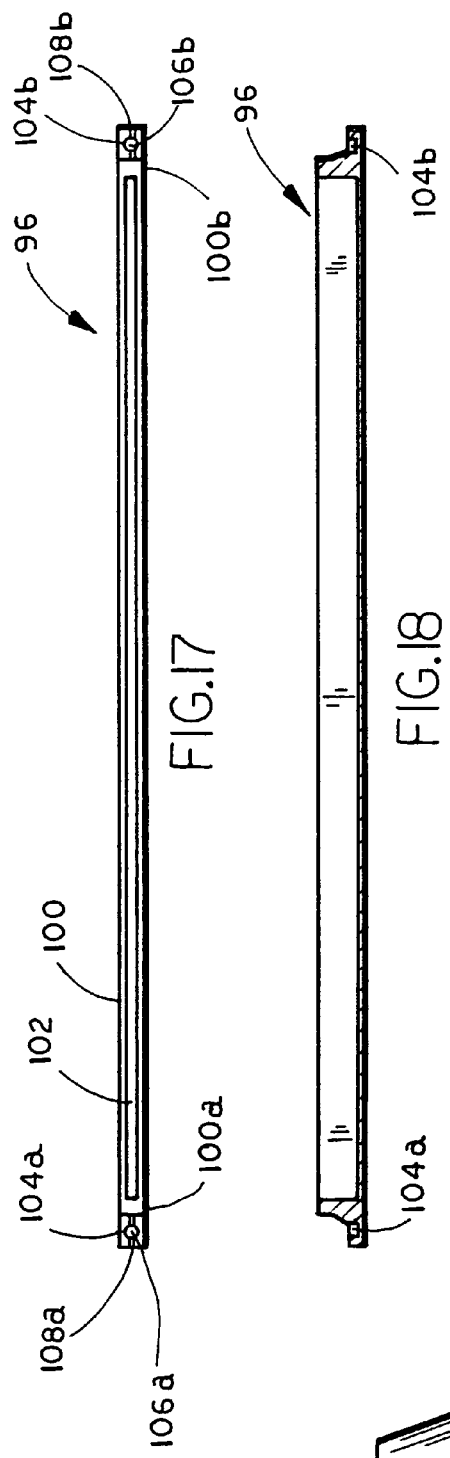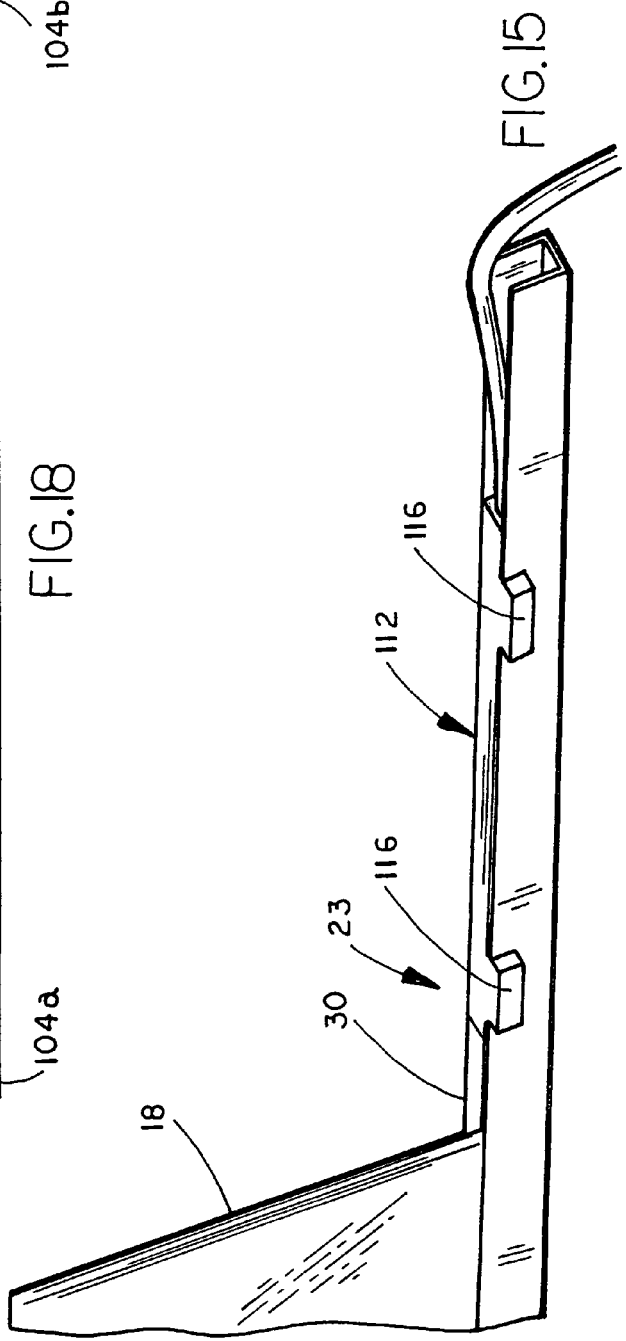

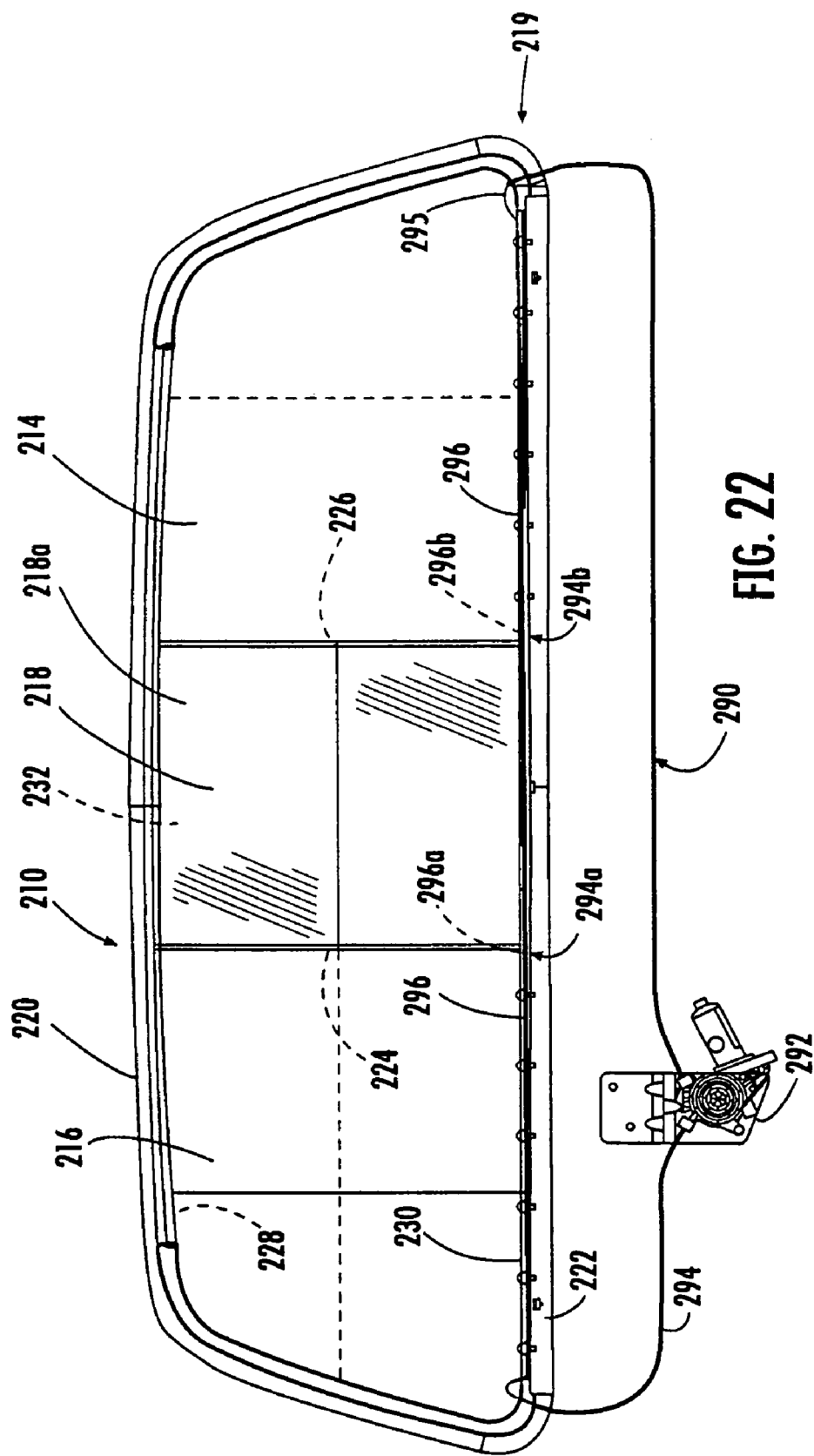

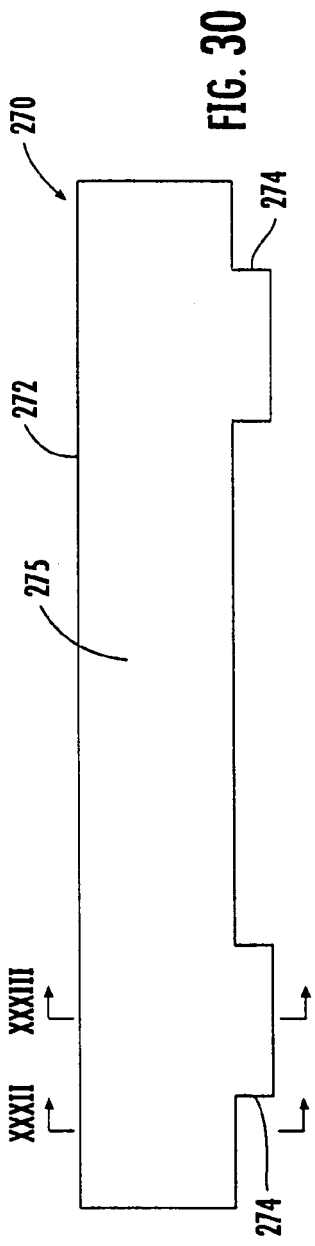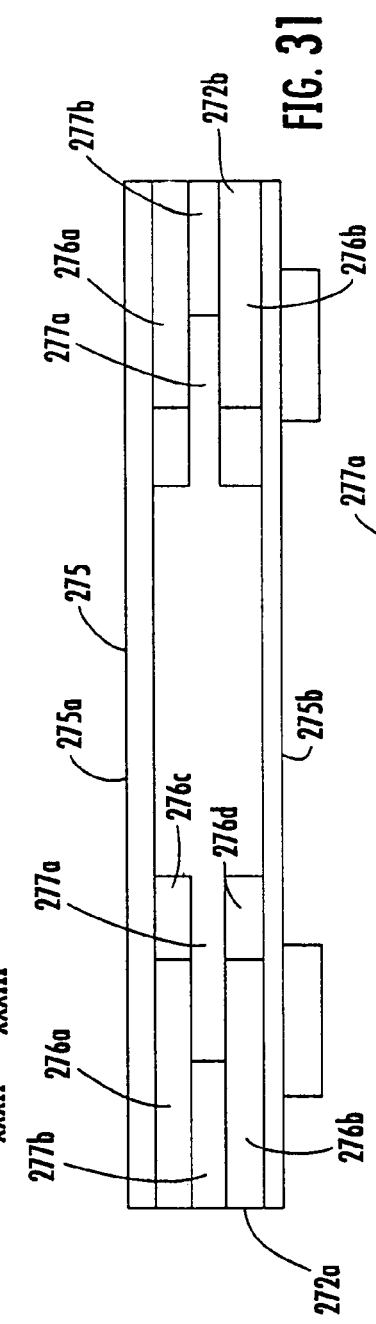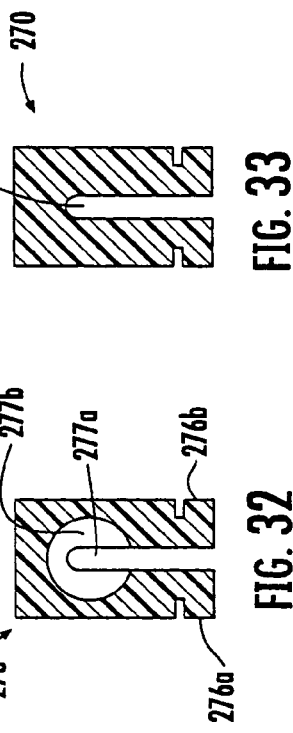

HORIZONTAL SLIDER WINDOW ASSEMBLY

This application claims priority from and incorporates by reference herein U.S. provisional Pat. application Ser. No. 60/422,421, filed Oct. 30, 2002, entitled HORIZONTAL SLIDER WINDOW ASSEMBLY and claims priority as a CIP of patent application Ser. No. 10/113,056, filed Apr. 1, 2002 in their entireties.

TECHNICAL FIELD AND BACKGROUND OF THE INVENTION

The present invention relates to a window assembly and, more particularly, to a rear window assembly with a horizontal sliding pane, such as for use as a rear window in a light truck, such as a pick-up truck.

Horizontal sliding window assemblies typically include one or more fixed panes and a sliding pane. The sliding pane is supported for horizontal movement in a track that is mounted or otherwise formed as part of the window assembly support system. Motorized sliding windows have incorporated a wide variety of drive assemblies, including cable drive systems, such as pull-pull cable drive systems. Pull-pull cable drive systems vary in arrangement but commonly include a driver drum and a cable that is wound about the drum with one end of the cable affixed or mounted to one side of the sliding pane and the other end of the cable affixed or mounted to the other side of the cable so that when the drum rotates in one direction the cable is tensioned to pull on one side of the sliding pane while the other end of the cable is released from the drum to follow the sliding pane. When the drum rotates in the opposite direction the sliding pane is moved in the opposite direction.

However, in some designs it has been found that the sliding pane may exhibit chatter or vibration in the track when it is moved along the track between its open and closed positions. This chatter or vibration tends to increase the load on the driver assembly. Given the inherent properties of cable drive systems, the point of engagement between the cable and the sliding pane generates some of high stress points in the widow assembly and, hence, subject to wear. Moreover, these window assemblies are subject to relative high use and, hence, cycling, which can result in increased stress and fatigue.

Consequently, there is a need for a support system that can reduce the stress in a horizontal slider window assembly while providing a window assembly that is easy to install and handle and, further, to minimize the weight and the cost of the assembly. Furthermore, it is desirable that the support system provide versatility/flexibility to accommodate both left and right sliding window assemblies.

SUMMARY OF THE INVENTION

Accordingly, the present invention provides a vehicular rearview window assembly that includes one or more fixed panes and one or more sliding panes, and which is particularly suitable for use as a rear window in a truck, such as a light truck or a pick-up truck. The window assembly incorporates a support system that includes a carrier for supporting the sliding pane for horizontal movement between its open and closed positions. The window assembly further includes a drive assembly that includes a selectively driven cable that is coupled to the carrier to thereby move the sliding pane between its open and closed positions. The carrier provides increase durability and fatigue resistance and, further, provides for better engagement with the cable.

In one form of the invention, a vehicular rear window assembly includes first and second fixed panes, a sliding pane, and a drive assembly for moving the sliding pane. The drive assembly includes a selectively driven cable with first and second ends. The window assembly further includes a support system that includes upper and lower horizontal members and a pair of spaced apart vertical members, which interconnect the upper and lower horizontal members, with the fixed panes mounted between upper and lower horizontal members. The support system further includes a carrier that supports the sliding pane for movement between its open and closed positions, with the carrier including an elongate body having an upwardly facing channel for receiving a portion of the sliding pane therein, with the body further including sockets for receiving and latching the ends of the cable to the carrier whereby the cable moves the sliding pane when the cable is driven.

In one aspect, the lower horizontal member includes a lower track, with the carrier moving the sliding pane between its open and closed positions in the lower track.

In other aspects, the elongate body of the carrier includes opposed ends, with the sockets provided in the opposed ends. In a further aspect, at least one of the sockets includes a receiving opening for receiving the respective end of the cable in an elongate slot, which is in communication with the receiving opening wherein the respective end of the cable is inserted into the socket through the receiving opening and then latched to the carrier when the end of the cable is moved into the elongate slot. For example, the socket may include an abutment adjacent the elongate slot for latching the respective end of the cable to the carrier.

In further aspects, the elongate body may include a viewing opening in communication with the socket to provide visual indication of when the respective end of the cable is latched with the carrier. For example, the viewing opening may be provided at the upper surface of the elongate body. Optionally, the elongate body may include a second viewing opening to provide additional visual indication of when the respective end of the cable is latched with the carrier. For example, the second opening may be provided at the lower surface of the elongated body.

In another aspect, the vehicular rearview window assembly may include a cover for the lower track of the lower horizontal member. For example, the cover may include at least one cable guide. Optionally, the cover may include a pair of cable guides.

In other aspects, the cable includes a cable sheath and a cable wire, with the cable guide of the cover further comprising a terminal for the cable sheath. In a further aspect, the cover is preferably engaged with the track. For example, the cover may include a cooperating structure which engages a cooperating structure provided in the track. For example, the cooperating structure of the cover may comprise a projecting cooperating structure, while the cooperating structure of the track may comprise a slot. A suitable projecting cooperating structure includes a lug.

According to another form of the invention, a vehicular rear window assembly includes a fixed pane, a sliding pane, a drive assembly, and support system. The support system includes upper and lower horizontal members and a pair of spaced apart vertical members similar to the previous form of the invention noted above. The lower horizontal member includes a track for guiding the sliding pane between its open and closed positions. The drive assembly includes a selectively driven cable which has a cable sheath and a cable wire, with the cable wire coupled to the sliding pane for selectively moving the sliding pane between its open and closed positions. The window assembly further includes a cover which is mounted in the track, with the cover comprising a channel shaped member having downwardly extending flanges, at least one cable wire guide, and a cable sheath terminal extending into one end of the cable cover between the flanges. The cable sheath of the cable terminates in the cable terminal, with the cable wire extending through the cable wire guide between the flanges to couple to the sliding pane.

In one aspect, the sliding pane is supported in the track by a carrier. In a further aspect, the cable wire is preferably coupled to the carrier.

Accordingly, the present invention provides a window assembly with a support system that provides better engagement between the drive assembly cable and the sliding pane and, further, which provides long-term durability and greater fatigue resistance than support systems heretofore known.

These and other objects, advantages, purposes, and features of the invention will become more apparent from the study of the following description taken in conjunction with the drawings.

DETAILED DESCRIPTION OF THE DRAWINGS

FIG. 3 is a cross-section view taken along line III—III of FIG. 2;

FIG. 4 is a cross-section view taken along line IV—IV of FIG. 2;

FIG. 5 is a cross-section view of V—V of FIG. 2;

FIG. 6 is a cross-section view of VI—VI of FIG. 2;

FIG. 7 is a cross-section view of VII—VII of FIG. 2;

FIG. 8 is a cross-section view of VIII—VIII of FIG. 2;

FIG. 9 is a cross-section view of IX—IX of FIG. 2;

FIG. 10 is a cross-section view of X—X of FIG. 2;

FIG. 11 is a cross-section view of XI—XI of FIG. 2;

FIG. 12 is a cross-section taken along line XII—XII of FIG. 2;

FIG. 13 is an enlarged cross-section view taken along line XIII—XIII of FIG. 2;

FIG. 14 is an enlarged cross-section view taken along line XIV—XIV of FIG. 1;

FIG. 15 is a fragmentary view of a drive assembly for the horizontal slider window assembly of the present invention;

FIG. 17 is a top plan view of a window slider member of the driver assembly;

FIG. 18 is a side elevation view of the window slider member of FIG. 17;

FIG. 22 is an inside elevation view of another embodiment of the window assembly of the present invention;

FIG. 30 is an enlarged top plan view of a cover of the window assembly of FIG. 22A;

FIG. 31 is a bottom plan view of the cover of FIG. 30;

FIG. 32 is a cross-section view taken along line XXXII—XXXII of FIG. 30;

FIG. 33 is a cross-section view taken along line XXXIII—XXXIII of FIG. 30;

DETAILED DESCRIPTION OF THE PREFERRED EMBODIMENTS

Figure 1:
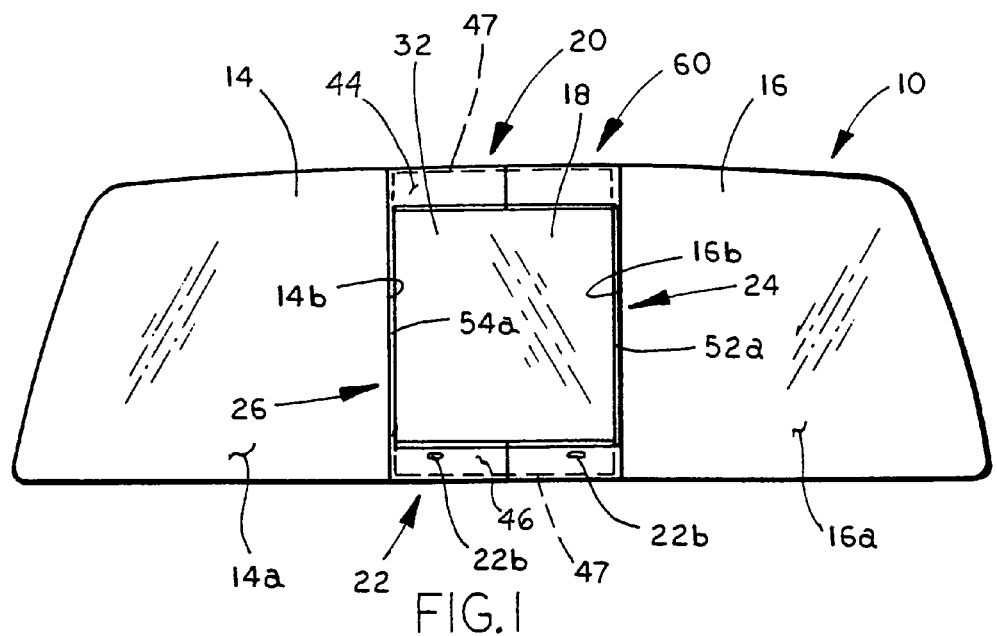
FIG. 1 is a front elevation view of a horizontal slider window assembly of the present invention.
Figure 2:
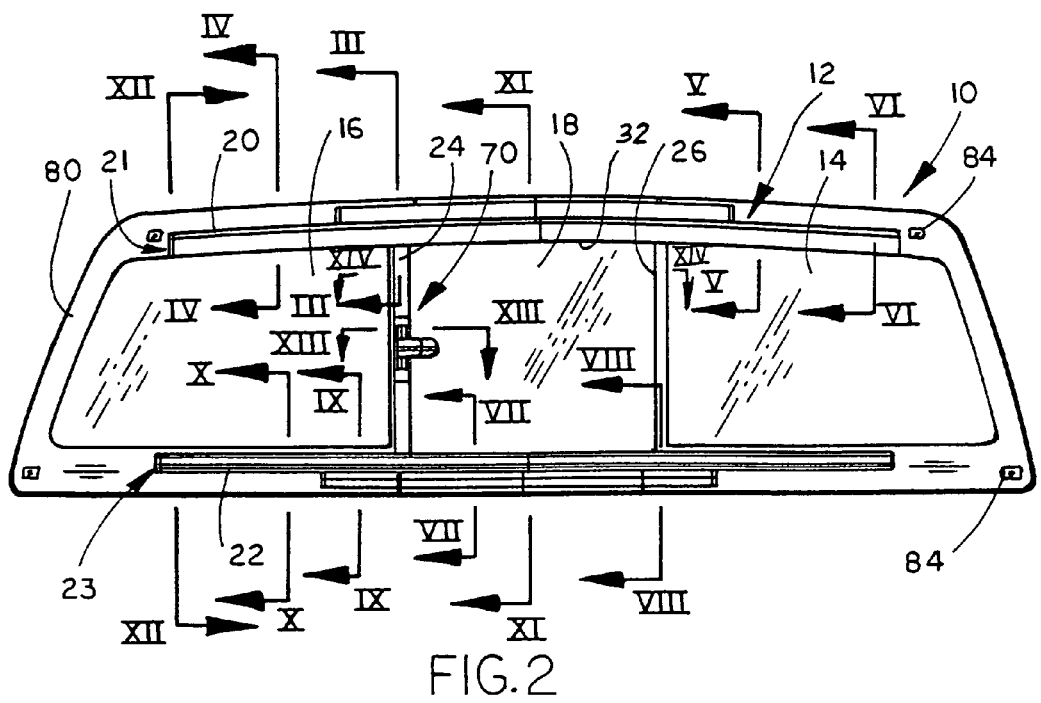
FIG. 2 is a rear elevation view of the window assembly of FIG. 1.

Referring to FIGS. 1 and 2, the numeral 10 generally designates a rear horizontal slider window assembly of the present invention, which is particularly suitable for use as a rear window or backlite of a vehicle, such as a light truck, including a pick-up truck or the like. Horizontal slider window assembly 10 incorporates a support system 12 that integrates one or more fixed panes with one or more sliding panes as a window assembly unit so that the window assembly can be manufactured at a window assembly plant that is located remotely from a vehicle assembly plant. Furthermore, since the window assembly is supplied as a unit, it can be handled more easily, especially during installation at the vehicle assembly plant, where the window assembly unit is mounted in an opening or recess in the vehicle body (such as the rear window opening). In addition, support system 12 provides a more versatile support system that can be mounted to different window shapes and sizes and, further, preferably provides a generally flush mounting of window assembly 10 in the vehicle body.

In the illustrated embodiment, window assembly 10 includes a first fixed pane 14, a second fixed pane 16, and one or more sliding panes 18. Panes 14, 16, and 18 preferably comprise transparent or tinted tempered glass panes; however, it should be understood that panes 14, 16, or 18 may comprise plastic panes, including transparent or tinted plastic panes. As will be more fully described below, support system 12 provides sufficient rigidity and support to fixed panes 14 and 16 and to sliding pane 18 so that assembly 10 can be mounted in an opening of a vehicle as a unit while eliminating the need for a full-circumference frame.

Referring to FIG. 2, support system 12 includes an upper horizontal member 20 and a lower horizontal member 22 that are spaced apart but interconnected by vertical members 24 and 26. Vertical members 24 and 26 together with the central portions of upper and lower horizontal members 20, 22 form an opening 32, which defines the central opening of the window assembly 10, and over which sliding pane 18 is moved when moved to its closed position.

Support system 12 is preferably formed by integrally molding, such as by injection molding, a plastic material (such as a thermoplastic or thermoset material) about one or more rails or channel members, with the channel member(s) being preferably formed in a separate forming operation and being placed in the molding apparatus as a preformed entity. Suitable plastics include thermosetting polyurethanes. Such thermosetting polyurethanes preferably include, for example, a reaction injection molding polyurethane, a polyethylene terephthalate (PET), polypropylene, nylon, including a reinforced nylon, acrylonitrile-butadeine-styrene (ABS), or polycarbonate/polybutylene terephthalate (PC/PBT) or thermoplastic urethane (TPU). However, support 12 may comprise another formable rigid material, including metal or a composite material, such as a reinforced plastic, without affecting the scope of the present invention. Upper and lower horizontal members 20 and 22 comprise a pair of rails 28 and 30, such as channel-shaped members (FIGS. 5 and 8), preferably metal channel-shaped members, that are at least partially (and more preferable substantially) encased/encapsulated in the plastic material noted above. Rails 28 and 30 are oriented such that their open sections are facing towards each other to form or provide upper and lower tracks, which receive sliding pane 18. Preferably rails 28 and 30 comprise extruded aluminum rails; however, it can be appreciated that rails 28 and 30 may comprise rolled metal rails. Optionally, the rails may comprise and/or be formed by a plastic material or a composite material, such as a reinforced plastic or the like. In addition, rails 28 and 30 may be formed by "rolltrusion" in which the base of the rail is rolled from a metal with a polymer extruded onto the base to form, for example, a seal. Alternately, support system 12 may be formed from metal components, such as lightweight metal components, such as aluminum components.

In the illustrated embodiment, lower channel-shaped member 30 includes an enlarged upper section 30a, which receives the lower edge of sliding pane 18, and a lower section 30b, which provides a trough to collect water that may have entered into lower horizontal member 22. In order to channel or guide water out of lower horizontal member 22, lower portion 30b of channel-shaped member 30 includes one or more openings 30c, which communicate with a transverse passage 22b formed in member 22 that exits and directs water through exterior surface 46 of member 22.

Fixed panes 14 and 16 are mounted to horizontal members 20 and 22 on either side of vertical members 24 and 26 preferably by an adhesive. Suitable adhesives include an epoxy adhesive, a silicone adhesive, a urethane adhesive, including a one-part and more preferable a two-part urethane adhesive, an acrylic adhesive, and a polyvinylbutyral adhesive, or the like. Fixed panes 14 and 16 are shown generally in the shape of a generally trapezoidal shaped pane and include upper, outer, lower and inner peripheral edges, which are preferably substantially free of attachment to support system 12 so that window assembly 10 has an appearance of "floating" in the vehicle body opening. Furthermore, the outer or end peripheral portions of the inner surface of fixed panes 14 and 16 are substantially free of attachment to support system 12. Referring to FIG. 2, the distal ends of horizontal members 20 and 22 are preferably spaced inwardly from the outer edges of fixed panes 14 and 16. However, it can be appreciated that, depending on the size and shape of fixed panes 14 and 16, the distance may vary, therein providing a more versatile support system. Alternately, fixed panes 14 and 16 may be substantially rectangular-shaped or triangular-shaped, or other shape depending on the application, without affecting the scope of the present invention. For further details of suitable adhesives, and primer materials, which may be employed to enhance the bond between panes 14 and 16 and support system 12, reference is made to U.S. Pat. Nos. 5,853,895; 5,822,932; 6,293,609; 6,319,344; 6,068,719; 6,086,138; 6,089,646; 5,864,996; 5,707,473; 5,635,281; 5,544,458; 5,591,528; 5,611,180; and 5,807,515 all of which are commonly owned by Donnelly Corporation of Holland, Mich. and are herein incorporated by reference in their entireties.

Referring to FIGS. 3–12, upper and lower horizontal members 20 and 22, respectively, generally comprise channel-shaped members 21 and 23 and include mounting surfaces 20a, 20b on one side, which are preferably recessed to receive the adhesive for mounting fixed panes 14 and 16 to upper and lower horizontal members 20, 22. In addition, upper and lower horizontal members 20, 22 include vertically extended flanges 40, 42 that extend above and below members 21 and 23, respectively, and between fixed panes 14 and 16 to form decorative exterior surfaces 44 and 46 as shown in FIG. 1. As best seen in FIG. 1, exterior surfaces 44 and 46 are generally flush with the exterior surfaces of vertical members 24 and 26, which together surround and frame central opening 32. In addition, as best seen in FIGS. 3 and 7–9, flanges 40 and 42 have recessed mounting surfaces 40a and 42a for receiving the adhesive, such as the adhesives noted above and below, for mounting window assembly to the vehicle body.

As best seen in FIG. 14, vertical members 24 and 26 have a rectangular cross-sectioned body 48 and 50 (respectively) and include channel-shaped portions 52 and 54. In the illustrated embodiment, vertical member 24 further includes a generally channel-shaped member 25, which is either mounted on or formed with rectangular shaped body 48, which provides a groove or channel into which sliding pane 18 moves when in its closed position. Preferably, positioned in generally channel-shaped member 25 is a seal (not shown), such as a double-L seal, a V seal, a C or U-shaped seal, a bulbous seal, or one of a number of different shaped-seals. Examples of suitable seals can be found in U.S. Pat. Nos. 6,220,650; and 6,299,235, which are incorporated by reference herein in their entireties. Fixed panes 14 and 16 are mounted on rectangular cross-sectioned bodies 48 and 50 on mounting surfaces 24a and 26a, respectively. Mounting surfaces 24a and 26a are preferably recessed to receive the adhesive for securing vertical members 24 and 26 to fixed panes 14 and 16, which is similar to the adhesive used to mount fixed panes 14 and 16 to horizontal members 20 and 22 as noted above. Furthermore, as best seen in FIG. 14, channel-shaped portions 52 and 54 abut and preferably are adhered to the inner side peripheral edges 14b, 16b, respectively, of fixed panes 14 and 16 and, further, include exterior surfaces 52a and 54a that are generally flush with the exterior surfaces 14a and 16a of fixed panes 14 and 16 and exterior surfaces 44 and 46. In addition, channel-shaped portions 52 and 54 include grooves or channels 52b and 54b for holding or supporting seals (not shown), which seal against the exterior surface of sliding pane 18. The seals may be bulbous seals, double-L seals, Y-shaped seals, or numerous other shaped seals.

Referring to FIG. 2, upper and lower horizontal members 20, 22 are spaced inwardly from the peripheral edges of fixed panes 14 and 16 so that upper and lower channel members 28 and 30 are spaced to receive the upper and lower edges of sliding pane 18, which in the illustrated embodiment has a smaller height dimension than fixed panes 14, 16. Flanges 40 and 42 extend between fixed panes 14 and 16 above and below sliding pane 18 to fill the space between fixed panes 14 and 16. Optionally, one or more exterior surface 44, 46 includes a raised peripheral portion 47 (FIG. 1) which aligns with the outer surfaces 52a and 54a of channel-shaped members 52 and 54 of vertical members 22 and 24 for styling purposes to form a framed central region 60 of window assembly 10. Alternately, outer surfaces 52a, 54a, 44 and 46 and the exterior surfaces 14a and 16 of panes 14 and 16 may all lie in the same plane.

To increase the rigidity of vertical members 24 and 26, vertical members 24 and 26 include therein, such as by encapsulation, rigid reinforcement elements, such as plate members 62 and 64, preferably metal plate members. Referring again to FIG. 14, plate members 62 and 64 include flange portions 66 and 68 which are oriented towards fixed panes 14 and 16 to provide additional stiffness to vertical members 24 and 26. As noted above, the rigid reinforcement elements provide rigidity to vertical members 24 and 26 and, further, provide a mounting surface for a catch or the like for a latch mechanism 70. Latch mechanism 70 is mounted to pane 18 by an adhesive, such as an epoxy adhesive, a silicone adhesive, a urethane adhesive, including a one-part and more preferable a two-part urethane adhesive, an acrylic adhesive, and a polyvinylbutyral adhesive, or the like, for locking sliding pane 18 in its closed position (see FIG. 2). The rigid reinforcement elements (62 and 64) extend through vertical members 24 and 26 but preferably terminate above channel-shaped members 28 and 30 to provide some local flexibility for upper and lower horizontal members to ease installation of sliding pane 18 in the upper and lower tracks formed by channel-shaped members 28 and 30. It should be understood that the reinforcement elements may be formed from other rigid materials, including a composite material, such as reinforced plastic or the like.

When sliding pane 18 is mounted in the tracks formed in upper and lower horizontal members 20 and 22, it can be appreciated that sliding pane 18 may be mounted for movement to the right or to the left as viewed in FIG. 2 given the symmetrical arrangement of support system 12, by switching vertical members 24 and 26. In addition, it can be further appreciated that two sliding panes may be incorporated into assembly 10 and supported in the respective tracks of upper and lower members 20, 22 in which case, both components of the latch mechanism may be mounted to the respective sliding panes. Examples of suitable bonding methods of latches or the like onto glass may be found, for example in U.S. Pat. Nos. 6,299,235; 5,864,966; and 6,086,138, which are incorporated by reference in their entireties.

Referring again to FIG. 2, optionally and preferably, fixed window panes 14 and 16 include a ceramic frit layer 80 (or other known coatings), which is preferably applied to the inner surfaces of fixed panes 14 and 16 along the peripheral portions thereof. The frit layer 80 is substantially opaque and functions to facilitate adhering or bonding of the support system 12 to fixed panes 14 and 16, while also improving the overall appearance of the window by providing a black-out function so that the bonding surfaces are then not visible from the exterior of the window. Further, frit layer 80 may define a viewing area through the fixed window panes that is generally commensurate in size with the viewing area through sliding pane 18. Frit layer 80 further conceals the respective fasteners 84, which are mounted by an adhesive to the inner surface of window assembly 10 for securing window assembly 10 into the body of the vehicle in which the window assembly is to be mounted. Suitable adhesives include an epoxy adhesive, a silicone adhesive, a urethane adhesive, including a one-part and more preferable a two-part urethane adhesive, an acrylic adhesive, and a polyvinylbutyral adhesive, or the like. Reference is also made to U.S. Pat. Nos. 4,364,214; 4,364,595; 6,299,255; and 6,220,650, for examples of suitable adhesives, which are incorporated by reference herein in their entireties.

As referenced above, to form support system 12, channel-shaped members 28 and 30 and reinforcing members 62 and 64 are placed in a mold cavity of a molding apparatus into which a plastic material (such as described above) is injected to at least partially (and more preferably substantially) encase/encapsulate the components. However, it should be understood that support system 12 may be formed by injecting a plastic material into a mold cavity of a molding apparatus, with the channel-shaped members 28 and 30 press-fit into the grooves formed in the upper and lower horizontal members, and with the reinforcing elements mounted or press fit into a receiving structure formed in the vertical members during molding. Preferably, channels or openings 22b and 30c are formed either during molding or otherwise formed in lower horizontal member 22 to provide a passageway for water that gets trapped in channel-shaped member 30 to flow out of window assembly 10. After support system 12 is formed, fixed panes 14 and 16 are placed on the mounting surfaces 20a and 22a of upper and lower horizontal members 20 and 22 and on mounting surfaces 24a and 26a of vertical members after an adhesive has been applied to the respective mounting surfaces. As noted above, suitable adhesives include an epoxy adhesive, a silicone adhesive, a urethane adhesive, including a one-part and more preferable a two-part urethane adhesive, an acrylic adhesive, and a polyvinylbutyral adhesive, or the like. The fixed panes (14, 16) are positioned so that the peripheral edges abut the channel-shaped portions 52 and 54 of vertical members 24 and 26 and, further, are preferably adhered at their edges to the sides of channel-shaped portions 52 and 54 by the adhesive. Sliding pane 18 is then inserted into the tracks formed in upper and horizontal members 20 and 22. In order to provide a substantially airtight/watertight seal at opening 32 when sliding pane 18 is moved to its closed position, seals are positioned in both the upper and lower tracks and, further, in the channel portions 52 and 54 of vertical members 24 and 26. The seals positioned in rails 21 and 23 and vertical members 24 and 26 may comprise an H-shaped seal, such as disclosed in U.S. Pat. No. 6,591,552, which is incorporated herein by reference in its entirety. As described in the reference pending application, the seal preferably comprises a single seal, which may be injection molded, for example from SANTOPRENE® brand polymeric material available from Monsanto Corporation. However, the seal may be formed from other materials, including EPDM and thermoplastic elastomers. In addition, the seals may comprise a bulbous seal, a V-shaped seal, a C or U-shaped seal, or any one of a number of different shapes.

In a preferred installation, the vehicle manufacture applies an adhesive, such as an epoxy adhesive, a silicone adhesive, a urethane adhesive, including a one-part and more preferable a two-part urethane adhesive, an acrylic adhesive, and a polyvinylbutyral adhesive, or the like, to the peripheral portion of the inner surface of window assembly 10 as well as to the recessed mounting surfaces 40a and 42a of flanges 40 and 42, which in combination with fasteners 74, secure window assembly 10 to the body of the vehicle. In this manner, the fixed panes (14 and 16) are directly bonded to the vehicle body. As a result, the mounting plane of window assembly 10 is offset with respect to the centroid of the support 12. In other words, support 12 is substantially recessed within the window opening of the vehicle.

In the embodiment illustrated in FIGS. 1–14, sliding pane 18 is manually movable between its closed and open positions; however, it should be understood that assembly 10 may incorporate or cooperate with a drive system to power sliding pane 18, such as the drive system illustrated in FIGS. 15–21 described below or the drive system described in Pat. No. 6,591,552, which is incorporated by reference herein in its entirety.

Figure 16:
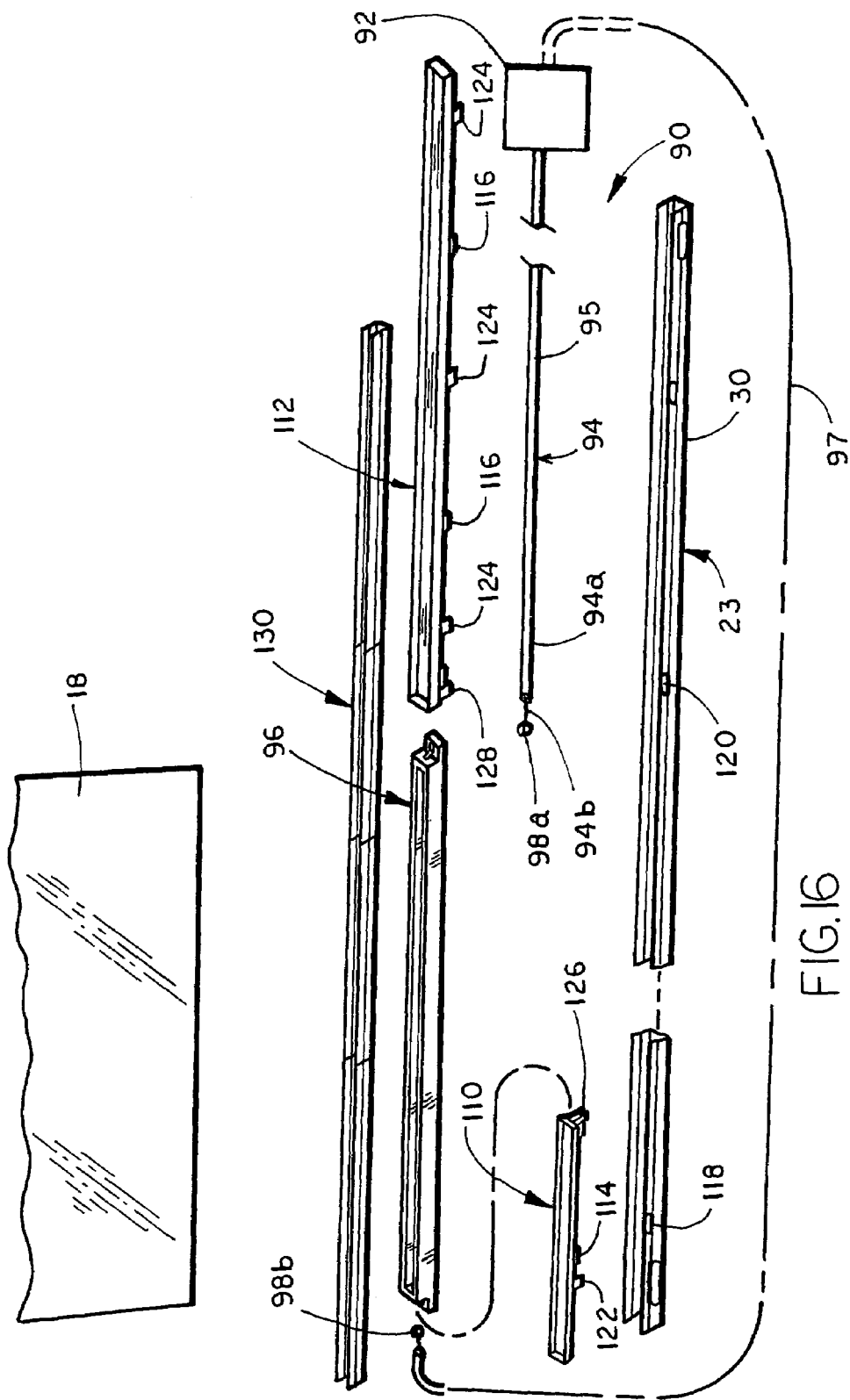
FIG. 16 is a fragmentary exploded perspective view of the driver assembly of FIG. 15.
Figure 19:
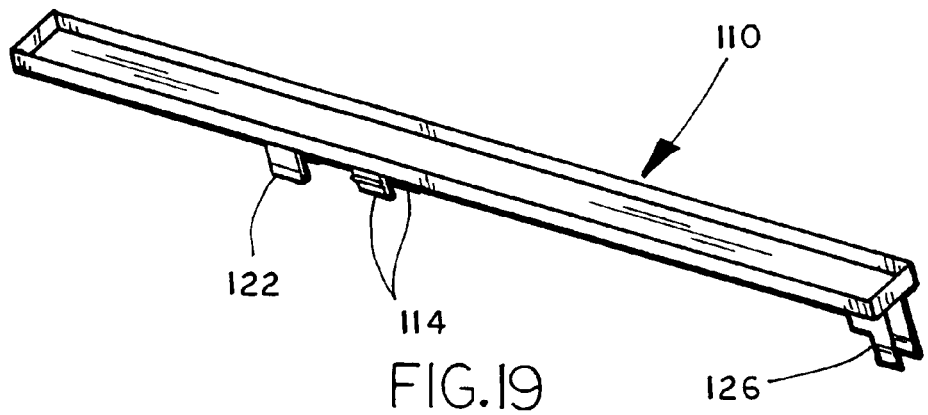
FIG. 19 is an enlarged view of the cover guide plate illustrated in FIG. 16.
Figure 20:
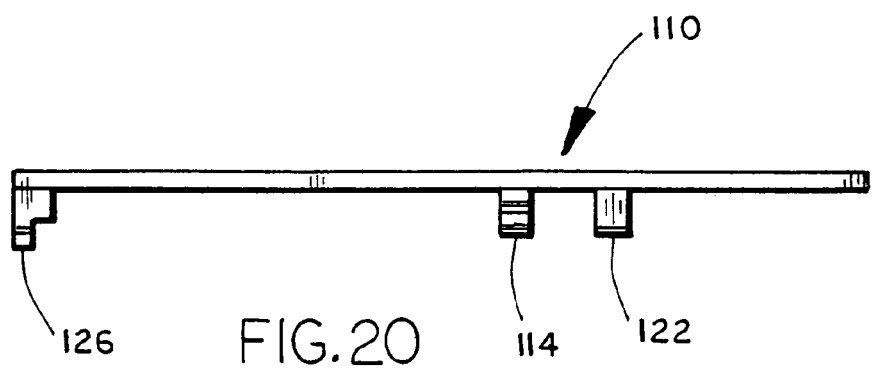
FIG. 20 is a side elevation view of the cover and guide plate of FIG. 19.
Figure 21:
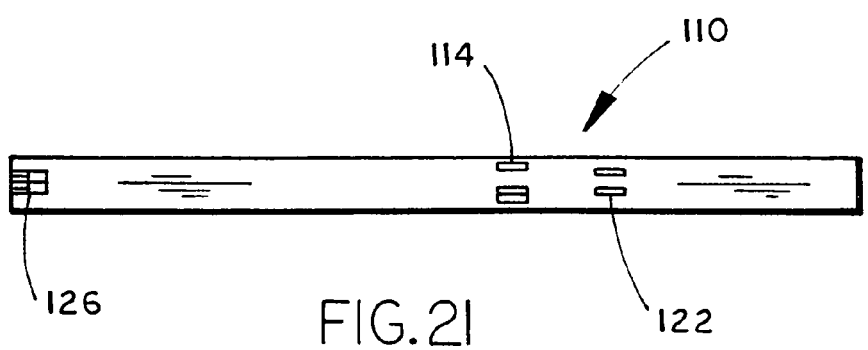
FIG. 21 is a bottom plan view of the cover and guide plate of FIG. 20.

As noted above, the sliding pane of window assembly 10 may incorporate a drive system to power the sliding pane. Referring to FIGS. 15 and 16, sliding pane 18 may be moved between its open and closed positions by drive assembly 90. Drive assembly 90 comprises a cabled-based drive assembly, which includes a cable drum and motor 92 and a cable 94. In the illustrated embodiment, sliding pane 18 is supported in track 23 by a window slider 96 in which the ends 98a and 98b of cable 94 are anchored.

Referring to FIGS. 17 and 18, window slider 96 comprises a generally channel-shape member 100 with closed ends 100a and 100b, which define a recess 102 in which the lower edge of sliding pane 18 is positioned. Slider 96 is preferably formed, such as by molding, from a plastic material, such as the plastic materials noted above; however, it should be understood that slider may be made from a composite material, such as reinforced plastic, or a metal, such as aluminum. Though not illustrated, recess 102 optionally and preferably includes a seal for sealing the lower edge of sliding pane 18. Furthermore, the seal may include one or more ribs to center pane 18 and slider 96 in the groove or channel of member 30.

As best understood from FIG. 18, distal ends 104a and 104b of slider 96 comprise projecting flanges, which include slotted openings 108a, 108b that communicate with enlarged openings 106a and 106b. Enlarged openings 106a and 106b receive the enlarged ends 98a and 98b of cable 94 with the wire 94b of cable 94 passing through openings 108a and 108b to thereby anchor the ends of the cable to both ends of the window slider (96).

In order to maintain cable 94 in the groove or channel of channel-shape member 30, window assembly 10 includes covers 110 and 112, which include downwardly depending tabs 114 and 116, respectively, that engage and cooperate with corresponding recesses 118 and 120 provided on the sides of channel-shape member 30. Preferably tabs 114 and 116 provide a snap-fit mounting of covers 110 and 112 to member 30.

It should be understood that covers 110 and 112 extend up to the edge of the range of travel of sliding pane 18 so as to not interfere with the movement of sliding pane 18 in channel-shaped member 30. In addition, covers 110 and 112 optionally include downwardly depending guide flanges or tabs 122 and 124 (FIGS. 19–21), respectively, which hold the cable in channel-shaped member 30 and, further, define a linear path for the cable through channel-shaped member 30. In addition, covers 110 and 112 include cable sheath termination members or blocks 126 and 128, which anchor the outer sheath or cover 94a of the cable 94 while permitting the wire 94b of the cable to pass through and extend and couple to window slider 96, as described above. Optionally and preferably positioned in channel-shape member 30 is a U-shape seal 130 which receives window slider 96 therein. Seal 130 preferably comprises an elastomeric seal, such as an EPDM or SANTOPRENE® seal and, furthermore, is preferably slip coated to reduce the wear on the seal and also the drive mechanisms of drive assembly 90.

As would be understood by those skilled in the art, when motor and drum 92 are actuated to pull on cable section 95 of cable 94, sliding pane 18 will move to the right as viewed in FIG. 16. In addition, while cable section 95 is pulled by motor and drum 92, cable section 97 will be extended. In the same manner, when motor and cable drum 92 pull on cable section 97, sliding pane 18 will be moved to the left (as viewed in FIG. 16).

As can be appreciated from FIG. 2, given the open design and mounting arrangement of support 12, cable 94 may exit support 12 through the open end of lower horizontal member 22 and, thereafter, bend over a relatively large radius path to extend behind the vehicle body panel to the motor and drum (92) which is preferably mounted below window assembly 10. Because the lower track of support 12 is offset from the mounting plane of window assembly 12, when cable 94 exits lower horizontal member 22, the path of cable 94 can at least initially remain in the same plane. In this manner, the path of the cable has no tight turns or bends, or convoluted paths, so that the cable (94) will not be subjected to excess bending when following its path from the motor and cable drum to the lower track. As a result, the amount of bending and twisting of cable 94 is significantly reduced over prior art window assemblies.

Referring to FIG. 22, the numeral 210 designates another embodiment of a window assembly of the present invention. Window assembly 210 includes a first fixed pane 214, a second fixed pane 216, and one or more sliding panes 218. Panes 214, 216, and 218 may comprise transparent or tinted tempered glass panes; however, it can be appreciated that panes 214, 216, 218 may comprise plastic panes, including transparent or tinted plastic panes. As will be more fully described below, window assembly 210 incorporates a support system 219 that provides an enhanced support for siding pane 218 and a means to couple the sliding pane to a drive assembly 290. Furthermore, support system 219 provides a means to provide an enhanced engagement between the sliding pane and the drive-assembly in a manner that exhibits long term durability and greater fatigue resistance.

Fixed panes 214 and 216 and sliding pane 218 are supported between upper and lower horizontal members 220 and 222, which are interconnected by vertical members 224 and 226. Vertical members 224 and 226 together with central portions of upper and lower horizontal members 220 and 222 form an opening, which defines a central opening of window assembly 210 and over which sliding pane 218 is moved when moved to its closed position. Upper and lower horizontal members 220 and 222 form a pair of rails 228 and 230, such as channel-shaped members, and preferably include metal channel-shaped members that are at least partially and, more preferably, substantially encased or encapsulated in a plastic material, similar to the previous embodiments. Rails 228 and 230 are oriented so that their open sections are facing toward each other to form or provide upper and lower tracks in which sliding pane is moved by drive assembly 290. For further details of upper and lower members 220, 222, vertical members 224, 226, and rails 228 and 230, reference is made to the previous embodiments.

Figure 22A:
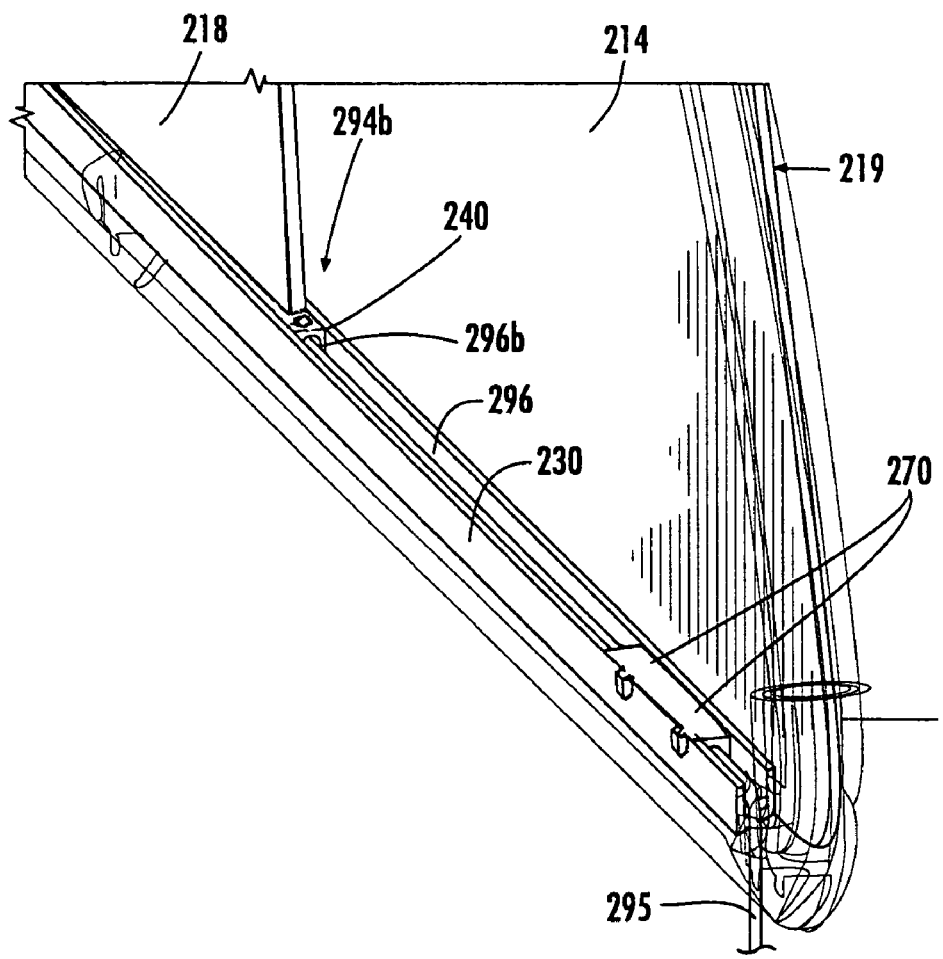
FIG. 22A is an enlarged fragmentary perspective view of the right end of the window assembly of FIG. 22.

Referring to FIG. 22A, support system 219 includes a carrier 240, which supports sliding pane 218 in rail 230 and, further, provides a means for coupling sliding pane 218 to drive assembly 290. As will be understood from the description that follows, carrier 240 is more robust than carriers heretofore known and generally provides a smoother movement for the sliding pane, as well as greater durability and increased fatigue resistance.

As best seen in FIG. 22, drive assembly 290 includes a motor 292 and a cable 294. Cable 294 includes opposed distal ends 294a and 294b, which are coupled to carrier 240 on opposed ends of carrier 240 so that when end 294b of cable 294 is pulled, for example, to the right as viewed in FIG. 22, sliding pane 218 will move to the right, for example to an open position, and when cable end 294a of cable 294 is pulled to the left, sliding pane 218 will move to the left, for example toward or to its closed position. Motor 292 includes a drum about which cable 294 is wound so that when the drum is rotated in one direction, one end 294a or 294b will be pulled while the other end 294b or 294a will be released so that it can be pulled in the same direction by the sliding pane, as would be understood by those skilled in the art. Furthermore, cable 294 comprises a conventional cable with a cable jacket or sheath 295 and a cable wire 296. In addition, cable 294 includes enlarged distal ends 296a and 296b that couple to carrier 240, as will more fully described below.

Figure 23:
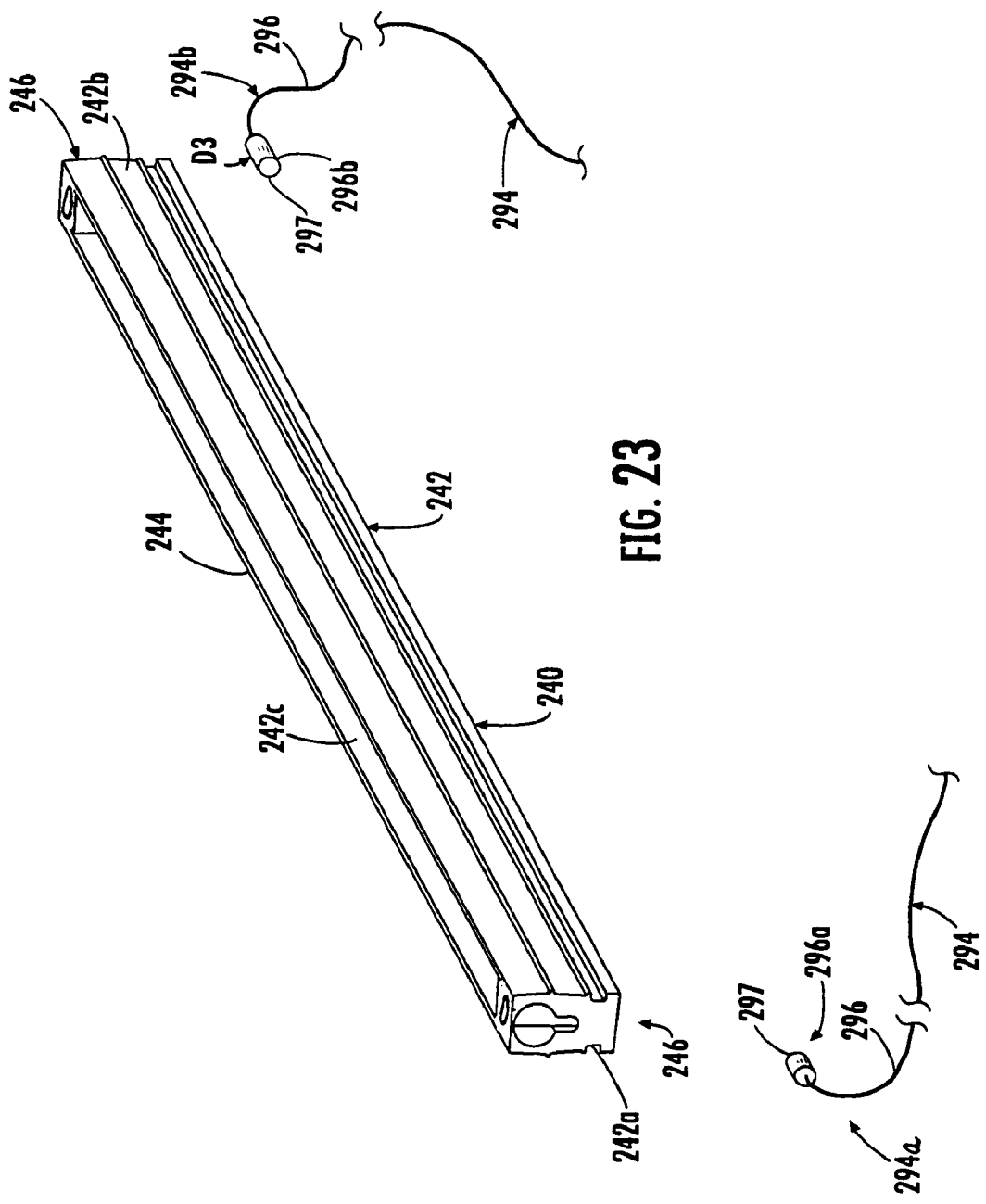
FIG. 23 is a perspective view of a window carrier of the window assembly of FIG. 22.
Figure 24:
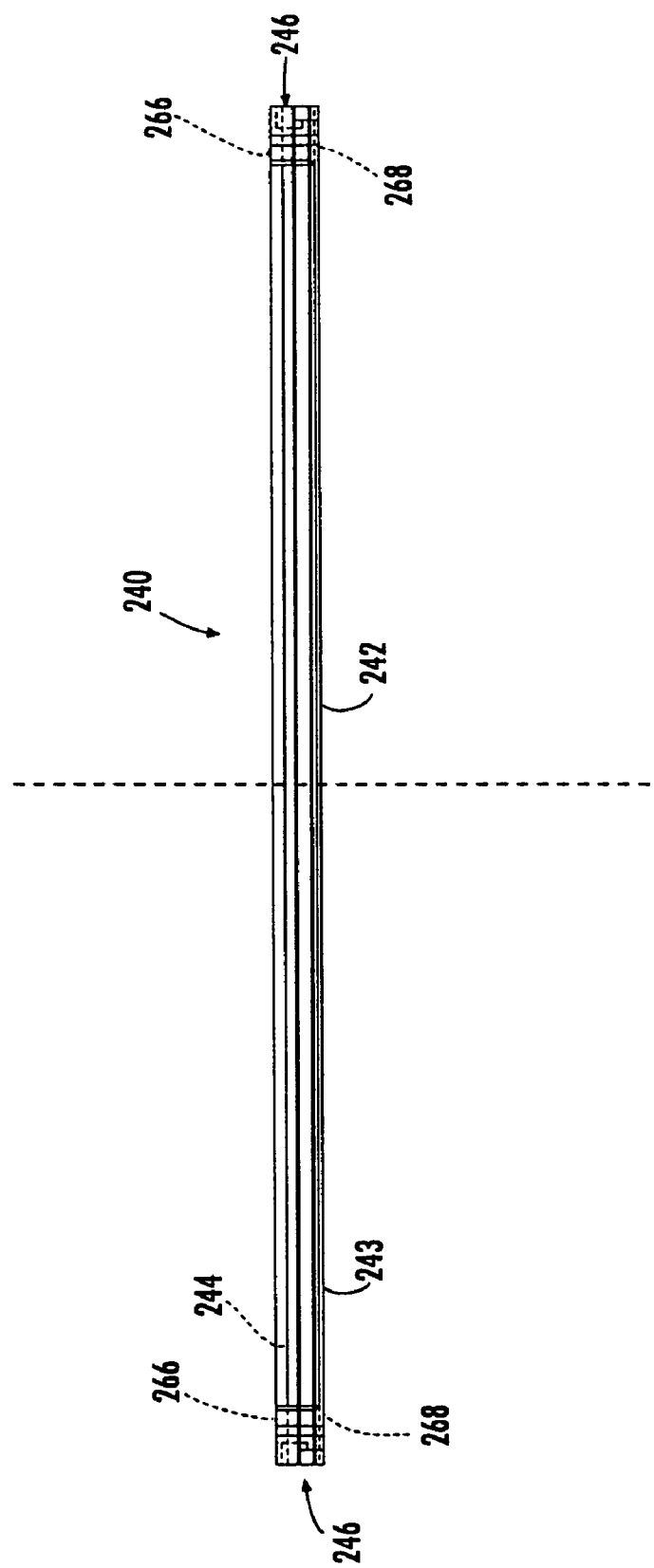
FIG. 24 is a side elevation view of the carrier of FIG. 23.

Referring to FIG. 23, carrier 240 comprises an elongate body 242 that includes an upwardly facing recess or cavity 244 for receiving a lower portion of sliding pane 218. Elongate body 242 is formed, such as by molding, from a polymer, preferably a reinforced polymer, such as a glass or mineral filled or talc filled polymer. Suitable commercial available polymers include NORYL or CAPRON from General Electric. Preferably, one or more seals are positioned in recess 244 to seal against at least the exterior surface 218a of sliding pane 218. In addition, elongate body 242 includes a pair of sockets 246 through which the respective enlarged ends (296a and 296b) of cable 294 couple to carrier 240. For ease of description, only one socket will be described herein.

Figure 26:
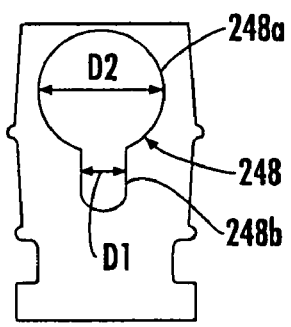
FIG. 26 is an end view of the carrier of FIG. 24.

Referring to FIG. 26, socket 246 is formed in end 242a of elongate body 242 and includes a keyhole opening 248 with an upper portion comprising a circular portion 248a and a lower portion comprising a slotted opening 248b, which has a smaller transverse or width dimension D1 than transverse dimension or width D2 of circular portion 248a. Referring again to FIG. 23, enlarged distal ends 296a and 296b of wire 296 comprise cylindrical bodies 297 which have a lateral dimension D3, which is less than dimension D2 but greater than dimension D1. In this manner, end 296a (and 296b) can be inserted into socket through circular portion 248a.

Figure 27:
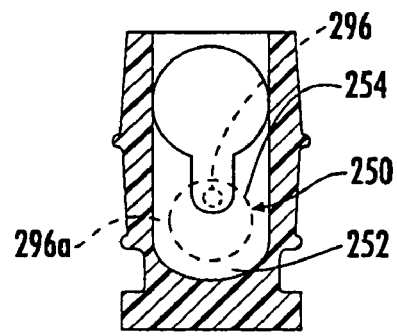
FIG. 27 is a cross-section view taken along XXVII—XXVII of FIG. 25.
Figure 28:
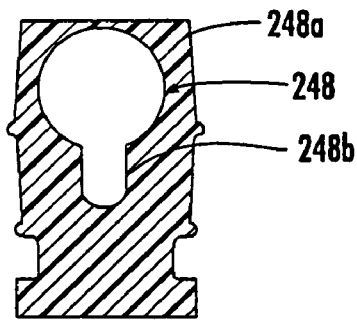
FIG. 28 is a cross-section view taken along line XXVIII—XXVIII of FIG. 25.

As best seen in FIG. 27, keyhole opening 248 is in communication with a cavity or chamber 250 that includes a recessed portion 252 that extends behind and below upper circular portion 248a of keyhole 248 and, further, below slotted opening 248b. In this manner, when enlarged distal end 296a of cable 296 is inserted into socket 246 through keyhole opening 248 enlarged distal end 296a (or 296b) may be seated in recess 252 by sliding wire 296 into slotted opening 248b to thereby couple or latch the respective enlarged distal end 296a or 296b or wire 296 to carrier 240. As best seen in FIG. 27, when enlarged distal end 296a is seated in recess 252, cylindrical body 297 is captured in socket 246 by engagement with abutment 254 formed on either side of slotted opening 248b. Furthermore, when enlarged distal end 296a is positioned in recess 252, wire 296 is aligned in slotted opening 248b. In this manner, side walls 262, 264, which extend to ends 242a and 242b of body 242, distribute the load from the interaction between the enlarged distal ends 296a and 296b of cable wire 296 and abutments 254 substantially across or through body 242 to reduce the local stresses in carrier 240.

Figure 29:
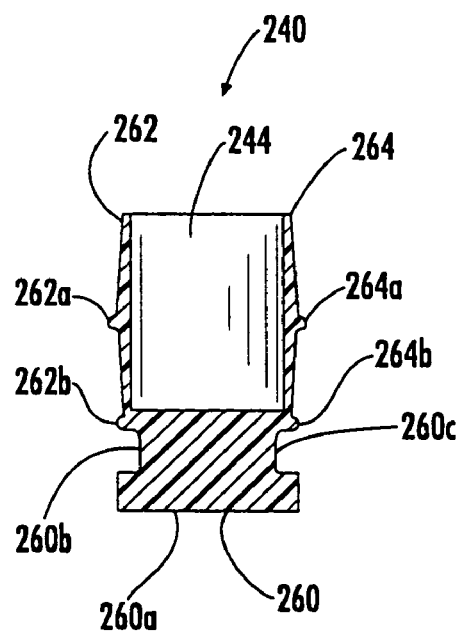
FIG. 29 is a cross-section view taken along line XXIX—XXIX of FIG. 25.
Figure 34:
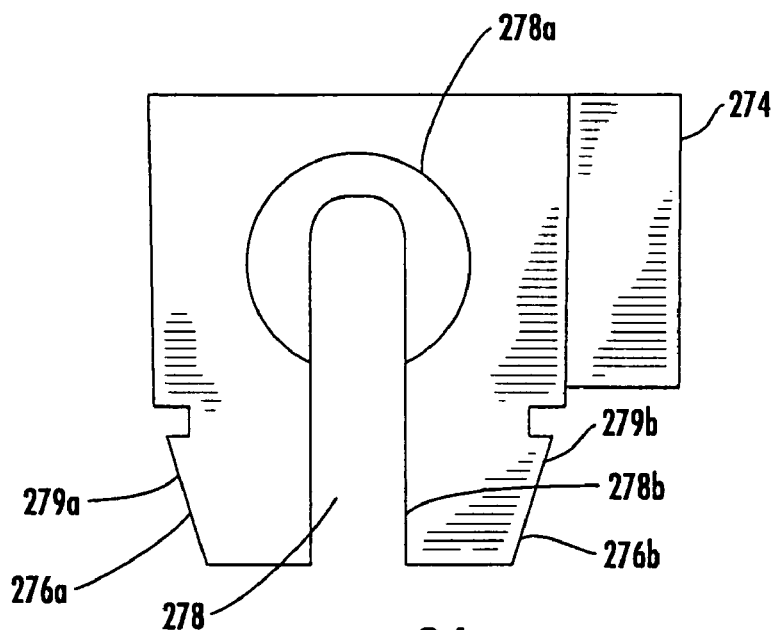
FIG. 34 is an enlarged end view of the cover of FIG. 30.

As best seen in FIG. 29, elongate body 242 of carrier 240 has a generally channel-shaped cross-section along its medial portion 242c and includes a base portion 260 with a pair of upwardly extending side walls 262 and 264 that define therebetween recess 244. Base portion 260 extends along the full longitudinal extent of body 242 and includes a generally planar bottom wall 260a and a pair of opposed grooves 260b and 260c which may provide guide surfaces for carrier 240 in the lower rail 230 of lower horizontal member 222. In addition, groves 260b and 260c may provide a snap-in attachment of carrier 240 into rial 230. In addition, upwardly extending side walls 262 and 264 may include one or more ribs 262a, 264a, 262b, and 262b, which, further, provide guide surfaces for carrier 240 in rail 230 of lower horizontal member 222 and tend to minimize binding of carrier 240 in rail 230. Referring again to FIG. 22A, when carrier member 240 is inserted into rail 230, sides 262 and 264 of carrier 240 engage the inner side surfaces of rail 230 to thereby guide sliding pane 218 between its open and closed positions. Optionally, carrier 240 forms a snap fit mounting with rail 230 to provide enhanced retention of carrier 240 and, hence, of sliding pane 218 in rail 230. It can be appreciated that carrier 240 provides for an improved engagement between sliding pane 218 and the cable ends and, further, exhibits greater durability as well as greater fatigue resistance than heretofore known.

Figure 25:
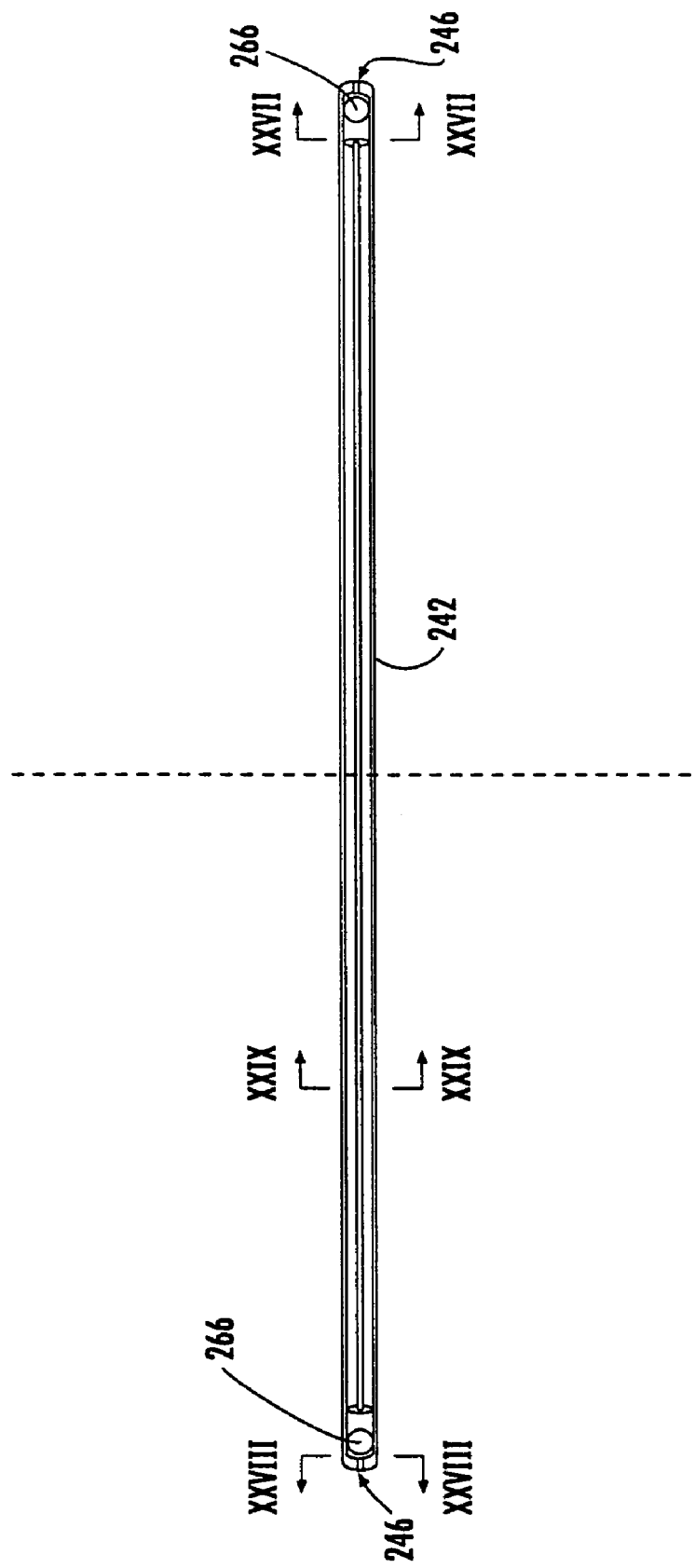
FIG. 25 is a top plan view of the carrier of FIG. 24.

Referring to FIG. 25, elongate body 242 may include sight openings 266 aligned over sockets 246 to allow a visual confirmation or check that the enlarged distal end 296a or 296b of cable 294 is properly engaged in the respective socket. Optionally, elongate body 242 may include a second pair of sight openings 268, for example, at its lower surface 243. In this manner, openings 266 and 268 may facilitate assembly of window assembly 210.

Referring again to FIG. 22A, window assembly 210 further includes covers 270 that are inserted into rail 230 to provide a guide for wire 296 of cable 294 and, further, to provide a terminal for cable sheath 295 of cable 294. Covers 270 are releasably mounted to rail 230 and may optionally provide a stop for sliding window pane 218 when moved to its open position, as will be more fully described below. Similar to carrier 240, covers 270 are formed, such as by molding, from a polymer, preferably a reinforced polymer, such as a glass or mineral filled or talc filled polymer. Suitable commercial available polymers include NORYL or CAPRON from General Electric.

Referring to FIGS. 30–35, each cover 270 includes an elongate body 272 with a pair of outwardly projecting structures or protrusions 274, such as lugs, which provide releasable attachment of cover 270 in rail 230 by cooperation with corresponding receiving structures, such as slots, provided in the sidewall of rail 230 (as best seen in FIG. 22A). In this manner, when covers 270 are mounted in rail 230, covers 270 may provide lateral stops for carrier 240 to limit the range of movement of carrier 240 and hence sliding pane 218 between its desired open and closed positions. Referring to FIG. 31, elongate body 272 has a generally channel-shaped medial portion 275 defined by web 275 and flanges 275a, 275b which project downwardly from web 275 when cover 270 is inserted into rail 230. Flanges 275a and 275b include enlarged portions 276a and 276b that define therebetween a wire guide 277a and a cable sheath terminal 277b. As best understood from FIGS. 31 and 34, each end 272a and 272b of body 272 includes a keyhole-shaped passageway 278 that includes an upper rounded passageway 278a and a lower elongate or slotted passageway 278b, which is in communication with upper rounded passageway 278a. Both passageways 278a and 278b define a linear path for cable 294. Rounded passageway 278a terminates at a general medial portion between extended flanges 276a and 276b, while elongated or slotted passageway 278b extends through flanges 276a and 276b to thereby provide a linear guide path for the respective ends of wire 296 of cable 294. It should be understood that although cover 270 is illustrated with having two cable wire guides and two cable terminals, cover 270 may include a single cable wire guide and a single cable terminal; however, for ease of manufacture and greater flexibility, it may be preferable for cover 270 to include left and right cable guide wires and terminals so that cover 270 may be used on either side of sliding window pane 218, as would be understood by those skilled in the art. Covers 270, therefore, in addition to providing stops for carrier 240 and sliding pane 218, also provide a cable management system that provides for enhanced retention of the cable in rail 230.

Figure 35:
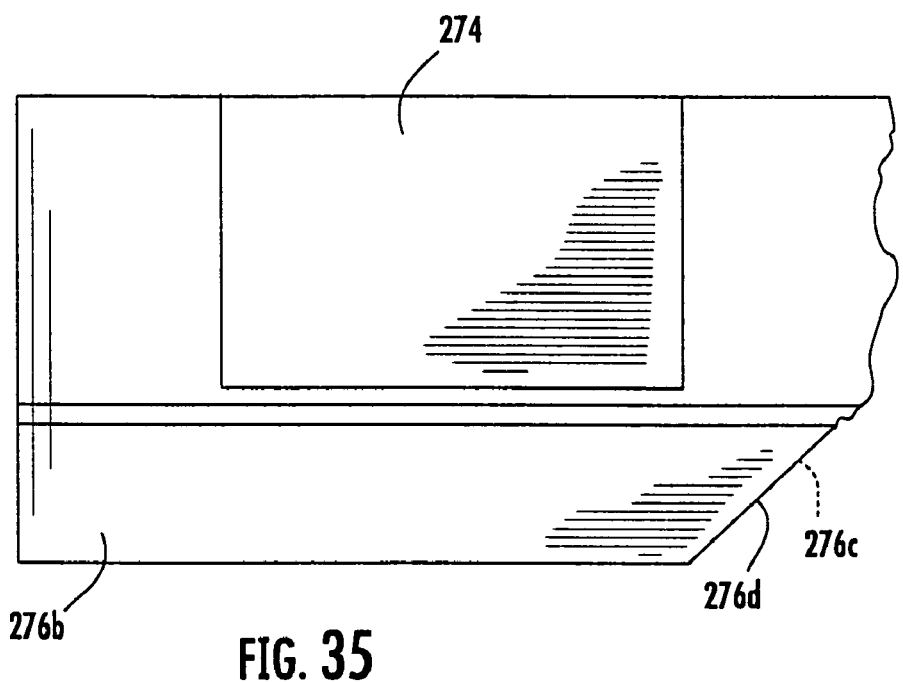
FIG. 35 is an enlarged fragmentary side elevation view of the cover of FIG. 30.

Referring again to FIG. 34, extended flanges 276a and 276b have angled outer surfaces 279a and 279b, which optionally form camming surfaces. For example, when cover 270 is inserted into rail 230, surfaces 279a and 279b may engage a corresponding structure or structures provided in rail 230, which urge flanges 276a and 276b toward each other to thereby decrease the width of passageway 278a to thereby enhance the engagement of the cable sheath of cable 294. Furthermore, such engagement may provide frictional engagement of cover 270 by rail 230. In addition, flanges 276a and 276b may include optional grooves, which extend along body 272 to provide an optional engagement structure for cover 270 with rail 230, as would be understood by those skilled in the art. As best seen in FIG. 35, flanges 276b (as well as flanges 276a) may be tapered at their respective ends 276d and 276c to provide a transition between flanges 276a, 276b, and web 275 to thereby reduce the local stresses on web 275.

It can be appreciated from the foregoing that window assemblies 10, 210 incorporate a simplified support system that is easier and less costly to manufacture than support systems heretofore known. Furthermore, the support system integrates and provides sufficient rigidity to the components of the respective window assemblies to form window assembly units that are lighter and relatively easy to install, thus further reducing the costs of the installed window assembly.

While several forms of the invention have been shown and described, other forms will now be apparent to those skilled in the art. For example, any of the components forming the supports for the window assemblies may be formed by the rolltrusion method noted in reference to member 30. This method cuts assembly time and hence costs. In addition, though illustrated as a generally symmetrical support system to accommodate left or right movement of the sliding window, it should be understood that the support system may be asymmetrical. Further, while the location of the window opening is illustrated as being centrally located, the opening may be offset. In addition, window assemblies 10 and 210 may incorporate other features not specifically mentioned in this application. For example, the window assemblies may incorporate post-attached structures, such as described in U.S. Pat. Nos. 5,352,010 and 5,451,090, which are incorporated by reference in their entireties, and accessories, such as storage compartments or the like mounted thereto, such as disclosed in U.S. Pat. No. 6,231,111, which is incorporated by reference herein in its entirety. In addition, window assembly 10 may incorporate lights, such as interior map lights or the like, or lights that direct exteriorly of the vehicle, such as brake lights (CHMSL lights), turn signals, or the like, which may be incorporated into the support (such as flanges 40 or 42) or may be directly bonded to the fixed panes, such as by an epoxy adhesive, a silicone adhesive, a urethane adhesive, including a one-part and more preferable a two-part urethane adhesive, an acrylic adhesive, and a polyvinylbutyral adhesive, or the like. In addition, the details and/or components of the various embodiments may be interchanged or recombined. Furthermore, the carriers and cable terminals, such as covers 270, may be used in combination with different window pane support systems, such as a full circumference support system, which are commonly known in the art. Therefore, it will be understood that the embodiments shown in the drawings and described above are merely for illustrative purposes, and are not intended to limit the scope of the invention which is defined by the claims that follow as interpreted under the principles of patent law including the doctrine of equivalents.

I claim:

1. A vehicular rear window assembly comprising:
    a first fixed pane;
    a second fixed pane;
    a sliding pane;
    a drive assembly for moving said sliding pane, said drive assembly including a selectively driven cable having a first enlarged end and a second enlarged end; and
    a support system comprising:
        an upper horizontal member, a lower horizontal member, and a pair of spaced apart vertical members, said vertical members interconnecting said upper horizontal member and said lower horizontal member to define an opening, said fixed panes mounted between said upper and lower horizontal members; and
        a carrier supporting said sliding pane for horizontal movement between open and closed positions, said carrier including an elongate body having an upper side with an upwardly facing channel for receiving a portion of said sliding pane therein and longitudinally opposed ends having outer surfaces generally orthogonal to said upper side, said body further including a keyhole-shaped opening comprising two differently sized openings in at least one of said outer surfaces of said ends spaced below said upper side for receiving and latching one of said ends of said cable to said carrier wherein said cable moves said sliding pane when said cable is driven.

2. The window assembly according to claim 1, wherein said lower horizontal member has a lower track, said carrier moving said sliding pane between said open and closed positions in said lower track.

3. The window assembly according to claim 2, further comprising a cover for said lower track.

4. The window assembly according to claim 3, wherein said cover includes a pair of cable guides.

5. The window assembly according to claim 3, wherein said cover includes at least one cable guide.

6. The window assembly according to claim 5, wherein said cable includes a cable sheath and a cable wire, said cable guide including a terminal for said cable sheath.

7. The window assembly according to claim 6, wherein said cover is engaged by said track.

8. The window assembly according to claim 7, wherein said cover includes a cooperating structure and said track includes a cooperating structure engaged by said cooperating structure of said cover.

9. The window assembly according to claim 8, wherein said cooperating structure of said cover comprises a projecting cooperating structure and said cooperating structure of said track comprises a slot.

10. The window assembly according to claim 9, wherein said projecting cooperating structure comprises a lug.

11. The window assembly according to claim 7, wherein said cover includes a pair of cooperating structures and said track includes a pair of cooperating structures engaged by said cooperating structures of said cover.

12. The window assembly according to claim 1, wherein each of said upper and lower horizontal members includes a channel-shaped member at least partially encapsulated in a polymeric material for defining upper and lower tracks, respectively, and said sliding pane being moved along said upper and lower tracks by said cable.

13. The window assembly according to claim 1, wherein one of said differently sized openings forms a receiving opening for receiving said one of said ends of said cable and the other one of said differently sized openings forms an elongate slot in communication with said receiving opening wherein said one of said ends of said cable is inserted into said receiving opening and then latched to said carrier when said cable is moved into said elongate slot.

14. The window assembly according to claim 13, wherein said carrier includes an abutment adjacent said elongate slot for latching said one of said ends of said cable to said carrier.

15. The window assembly according to claim 14, wherein said elongate body includes a viewing opening for determining when said one of said ends is latched with said carrier.

16. The window assembly according to claim 15, wherein said viewing opening is provided in said upper side of said elongate body.

17. The window assembly according to claim 15, wherein said elongate body includes a second viewing opening for determining when said one of said ends is latched with said carrier.

18. The window assembly according to claim 17, wherein said second viewing opening is provided in a lower surface of said elongate body.

19. A vehicular rear window assembly comprising:
   a fixed pane;
   a sliding pane;
   a drive assembly for moving said sliding pane, said drive assembly including a selectively driven cable having a first enlarged end and a second enlarged end;
   upper and lower tracks; and
   a carrier supporting said sliding pane for horizontal movement along said upper and lower tracks between open and closed positions, said carrier including a body having an upper side with an opening for receiving a portion of said sliding pane therein, said body further including longitudinally opposed ends, at least one of said longitudinally opposed ends having an outer surface generally orthogonal to said upper side, said outer surface including a keyhole-shaped opening comprising two differently sized openings formed therein and spaced below said upper side, said at least one of said longitudinally opposed ends including a cavity behind said keyhole-shaped opening and in communication with said keyhole-shaped opening, said keyhole-shaped opening for receiving said first end of said cable, and said first end of said cable being latched to said body when said first end of said cable is extended through one of said differently sized openings and seated in said cavity wherein said cable moves said sliding pane when said cable is driven.

20. The window assembly according to claim 19, wherein said cavity extends below said upper side.

21. The window assembly according to claim 19, wherein the other one of said differently sized openings has a narrower width than said one of said differently sized openings.

22. The window assembly according to claim 21, wherein said one of said differently sized openings comprises an upper portion and said other one of said differently sized openings comprises a lower portion.

23. The window assembly according to claim 22, wherein said portions of said cavities extend below said lower portions of said openings.

24. The window assembly according to claim 19, wherein said cavity extends below said other one of said differently sized openings.

25. The window assembly according to claim 19, wherein said carrier is positioned in said lower track.

26. The window assembly according to claim 25, further comprising a cover for said lower track.

27. The window assembly according to claim 26, wherein said cover includes at least one cable guide.

28. The window assembly according to claim 27, wherein said cable includes a cable sheath and a cable wire, and said cable guide includes a terminal for said cable sheath.

29. The window assembly according to claim 26, wherein said cover is engaged by said lower track.

* * * * *

UNITED STATES PATENT AND TRADEMARK OFFICE
CERTIFICATE OF CORRECTION

PATENT NO. : 7,073,293 B2  Page 1 of 1
APPLICATION NO. : 10/697372
DATED : July 11, 2006
INVENTOR(S) : Jim Galer It is certified that error appears in the above-identified patent and that said Letters Patent is hereby corrected as shown below:

<u>Column 12:</u>
Line 4, "rial" should be --rail--.

Signed and Sealed this

Tenth Day of April, 2007

JON W. DUDAS
*Director of the United States Patent and Trademark Office*